(12) United States Patent
Huang

(10) Patent No.: US 9,063,271 B2
(45) Date of Patent: Jun. 23, 2015

(54) OPTICAL IMAGING LENS ASSEMBLY AND IMAGE CAPTURING DEVICE

(71) Applicant: Largan Precision Co., Ltd., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 54 days.

(21) Appl. No.: 14/045,801

(22) Filed: Oct. 4, 2013

(65) Prior Publication Data

US 2015/0085175 A1 Mar. 26, 2015

(30) Foreign Application Priority Data

Sep. 25, 2013 (TW) ............................. 102134579 A

(51) Int. Cl.
*G02B 13/18* (2006.01)
*G02B 9/62* (2006.01)
*G02B 3/04* (2006.01)
*G02B 13/00* (2006.01)

(52) U.S. Cl.
CPC .............. *G02B 3/04* (2013.01); *G02B 13/0045* (2013.01); *G02B 9/62* (2013.01)

(58) Field of Classification Search
CPC ....... G02B 13/18; G02B 13/0045; G02B 9/62
USPC .......................................... 359/756, 757, 713
See application file for complete search history.

(56) References Cited

U.S. PATENT DOCUMENTS

| 8,743,482 | B1 | 6/2014 | Tsai et al. |
| 8,780,457 | B2 | 7/2014 | Tang et al. |
| 8,879,166 | B2 | 11/2014 | Tsai et al. |
| 8,908,295 | B1 | 12/2014 | Tsai et al. |
| 2014/0063323 | A1 | 3/2014 | Yamazaki et al. |
| 2014/0111872 | A1* | 4/2014 | Tang et al. ............... 359/713 |
| 2015/0015765 | A1 | 1/2015 | Lee |

FOREIGN PATENT DOCUMENTS

| JP | 2014-115431 A | 6/2014 |
| TW | 201413281 A | 4/2014 |

* cited by examiner

*Primary Examiner* — Scott J Sugarman
(74) *Attorney, Agent, or Firm* — CKC & Partners Co., Ltd.

(57) ABSTRACT

An optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave object-side surface and a convex image-side surface. The third lens element and the fourth lens element both have refractive power. The fifth lens element has refractive power, wherein both of the surfaces thereof are aspheric. The sixth lens element with negative refractive power has a concave object-side surface and a concave image-side surface, wherein the surfaces thereof are aspheric. The optical imaging lens assembly has a total of six lens elements with refractive power.

22 Claims, 19 Drawing Sheets

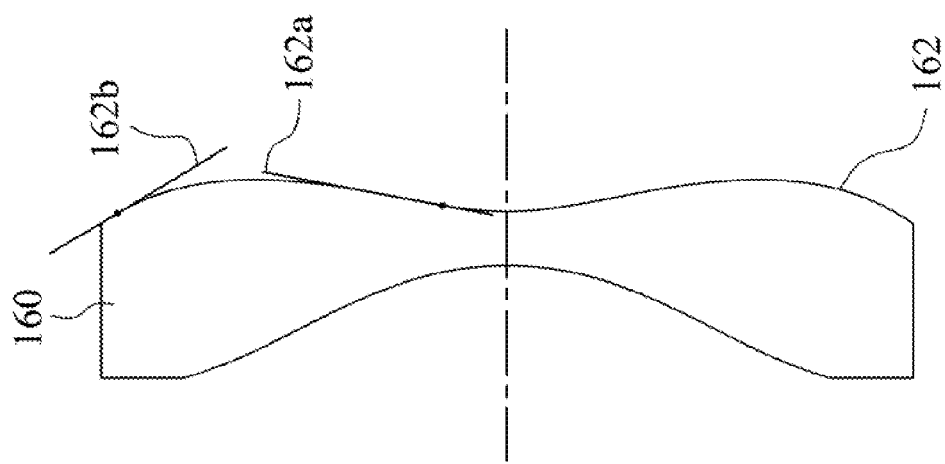

OPTICAL IMAGING LENS ASSEMBLY AND IMAGE CAPTURING DEVICE

RELATED APPLICATIONS

This application claims priority to Taiwan Application Serial Number 102134579, filed Sep. 25, 2013, which is incorporated by reference herein in its entirety.

BACKGROUND

1. Technical Field

The present disclosure relates to an optical imaging lens assembly. More particularly, the present disclosure relates to a compact optical imaging lens assembly applicable to electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the surface shape of the second lens element is unfavorable for effectively correcting astigmatism and spherical aberration both in a paraxial region and an off-axis region of the optical system. Moreover, the surface shape of the sixth lens element is unfavorable for effectively correcting aberration which results in unsatisfactory image quality.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave object-side surface and a convex image-side surface. The third lens element has refractive power. The fourth lens element has refractive power. The fifth lens element has refractive power, wherein both of an object-side surface and an image-side surface of the fifth lens element are aspheric. The sixth lens element with negative refractive power has a concave object-side surface and a concave image-side surface, wherein both of the object-side surface and the image-side surface of the sixth lens element are aspheric, and at least one of the object-side surface and the image-side surface of the sixth lens element has at least one inflection point. The optical imaging lens assembly has a total of six lens elements with refractive power. When a curvature radius of the object-side surface of the sixth lens element is R11, a curvature radius of the image-side surface of the sixth lens element is R12, an axial distance between the object-side surface of the first lens element and the image-side surface of the sixth lens element is Td, and a curvature radius of an image-side surface of the second lens element is R4, the following conditions are satisfied:

$-1.0 < (R11+R12)/(R11-R12) < 0.35$; and $-3.0 < Td/R4 < 0$.

According to another aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave object-side surface and a convex image-side surface. The third lens element has positive refractive power. The fourth lens element has refractive power. The fifth lens element has refractive power, wherein both of an object-side surface and an image-side surface of the fifth lens element are aspheric. The sixth lens element with negative refractive power has a concave object-side surface and a concave image-side surface, wherein both of the object-side surface and the image-side surface of the sixth lens element are aspheric, and at least one of the object-side surface and the image-side surface of the sixth lens element has at least one inflection point. The optical imaging lens assembly has a total of six lens elements with refractive power. When a curvature radius of the object-side surface of the sixth lens element is R11, a curvature radius of the image-side surface of the sixth lens element is R12, an axial distance between the object-side surface of the first lens element and the image-side surface of the sixth lens element is Td, and a curvature radius of an image-side surface of the second lens element is R4, the following conditions are satisfied:

$-1.0 < (R11+R12)/(R11-R12) < 0.65$; and $-3.0 < Td/R4 < 0$.

According to still another aspect of the present disclosure, an image capturing device includes the optical imaging lens assembly according to the aforementioned aspect and an image sensor, wherein the image sensor is located on an image plane of the optical imaging lens assembly.

BRIEF DESCRIPTION OF THE DRAWINGS

The disclosure can be more fully understood by reading the following detailed description of the embodiments, with reference made to the accompanying drawings as follows:

FIG. 19 shows the tangent lines on the image-side surface of the sixth lens element according to the optical imaging lens assembly of FIG. 1.

DETAILED DESCRIPTION

Figure 1:
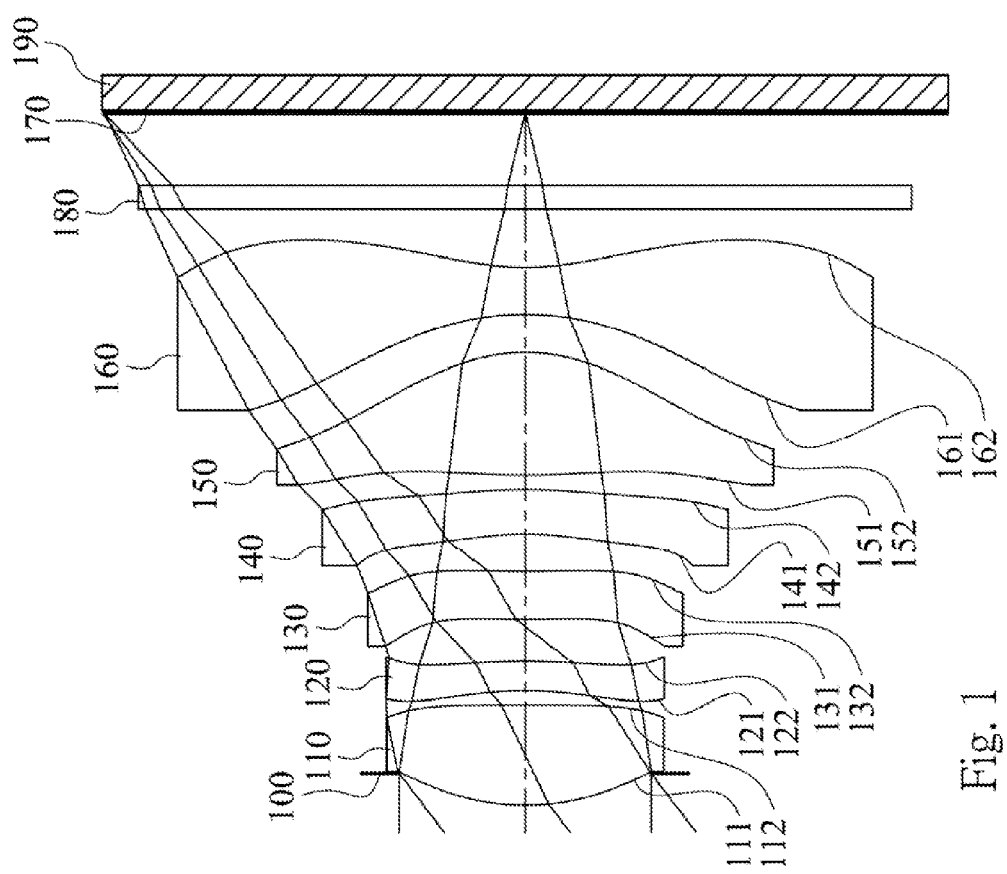
FIG. 1 is a schematic view of an image capturing device according to the 1st embodiment of the present disclosure.

An optical imaging lens assembly includes, in order from an object side to an image side, a first lens element, a second lens element, a third lens element, a fourth lens element, a fifth lens element and a sixth lens element, wherein the optical imaging lens assembly has a total of six lens elements with refractive power.

The first lens element with positive refractive power has a convex object-side surface. Therefore, the total track length of the optical imaging lens assembly can be reduced by properly adjusting the positive refractive power of the first lens element.

The second lens element with negative refractive power has a concave object-side surface and a convex image-side surface, so that it is favorable for effectively correcting the astigmatism and spherical aberration both in a paraxial region and an off-axis region of the optical imaging lens assembly. Furthermore, at least one of the object-side surface and the image-side surface of the second lens element has at least one inflection point, so that it is favorable for correcting the aberration of the off-axis.

The third lens element can have positive refractive power, so that it is favorable for effectively reducing spherical aberration. Furthermore, at least one of the object-side surface and the image-side surface of the third lens element has at least one inflection point, so that the aberration of the off-axis can be corrected.

The fourth lens element can have a concave object-side surface and a convex image-side surface, so that it is favorable for effectively correcting the astigmatism.

The fifth lens element can have positive refractive power and a convex image-side surface, so that it is favorable for effectively reducing the sensitivity of the optical imaging lens assembly.

The sixth lens element with negative refractive power has a concave object-side surface and a concave image-side surface. Therefore, it is favorable for enhancing the correction ability of the optical imaging lens assembly so as to further improve the aberration correction ability of each lens element in the optical imaging lens assembly. Furthermore, at least one of the object-side surface and the image-side surface of the sixth lens element has at least one inflection point, so that it is favorable for reducing the incident angle of the light projecting onto an image sensor so as to improve the responding efficiency of the image sensor. The slope of the tangent line changes from positive to negative between a paraxial region and an off-axis region of the image-side surface of the sixth lens element, so that it is favorable for effectively correcting the aberration of the off-axis.

When a curvature radius of the object-side surface of the sixth lens element is R11, and a curvature radius of the image-side surface of the sixth lens element is R12, the following condition is satisfied: $-1.0<(R11+R12)/(R11-R12)<0.65$. Therefore, it is favorable for enhancing the correction ability of the optical imaging lens assembly so as to further improve the aberration correction ability of each lens element of the optical imaging lens assembly. Preferably, the following condition is satisfied: $-1.0<(R11+R12)/(R11-R12)<0.35$. More preferably, the following condition is satisfied: $-0.55<(R11+R12)/(R11-R12)<0.15$.

When an axial distance between the object-side surface of the first lens element and the image-side surface of the sixth lens element is Td, and a curvature radius of the image-side surface of the second lens element is R4, the following condition is satisfied: $-3.0<Td/R4<0$. Therefore, it is favorable for correcting astigmatism and spherical aberration both in the paraxial region and the off-axis region of the optical imaging lens assembly and effectively keeping the optical imaging lens assembly compact. Preferably, the following condition is satisfied: $-1.3<Td/R4<0$.

When a curvature radius of an object-side surface of the third lens element is R5, and a curvature radius of an image-side surface of the third lens element is R6, the following conditions are satisfied: $R5>0$; and $R6>0$. Therefore, it is favorable for effectively correcting the astigmatism.

When an Abbe number of the second lens element is V2, an Abbe number of the fourth lens element is V4, and an Abbe number of the fifth lens element is V5, the following condition is satisfied: $0.2<(V2+V4)/V5<1$. Therefore, the chromatic aberration can be corrected.

When a focal length of the second lens element is f2, and a focal length of the sixth lens element is f6, the following condition is satisfied: $0.10<f6/f2<0.40$. Therefore, it is favorable for enhancing the correction ability so as to improve the efficiency of the aberration correction ability.

The optical imaging lens assembly can further include a stop, such as an aperture stop, which is disposed between an imaged object and the first lens element, wherein an axial distance between the stop and the image-side surface of the sixth lens element is Sd, and an axial distance between the object-side surface of the first lens element and the image-side surface of the sixth lens element is Td, the following condition is satisfied: $0.9<Sd/Td<1.0$. Therefore, the optical imaging lens assembly can have a good balance between the telecentricity and wide-angle feature.

When twice a maximum image height of the optical imaging lens assembly (a diagonal length of an effective photosensitive area of an image sensor) is DI, the axial distance between the object-side surface of the first lens element and the image-side surface of the sixth lens element is Td, and an axial distance between the image-side surface of the sixth lens element and the image plane is BL, the following condition is satisfied: $1.1 < DI/(Td+BL) < 2.5$. Therefore, it is favorable for shortening the back focal length of the optical 2o imaging lens assembly so as to keep a compact size thereof.

When an axial distance between the third lens element and the fourth lens element is T34, and an axial distance between the fourth lens element and the fifth lens element is T45, the following condition is satisfied: $1.5 < T34/T45 < 10$. Therefore, it is favorable for assembling the lens elements so as to increase the manufacturing yield rate.

When a curvature radius of the image-side surface of the fifth lens element is R10, and the curvature radius of the object-side surface of the sixth lens element is R11, the following condition is satisfied: $0.2 < R10/R11 < 0.9$. Therefore, it is favorable for effectively correcting the aberration.

When a central thickness of the second lens element is CT2, a central thickness of the third lens element is CT3, a central thickness of the fourth lens element is CT4, and a central thickness of the fifth lens element is CT5, the following condition is satisfied: $0.5 < (CT2+CT3+CT4)/CT5 < 1.3$. Therefore, it provides favorable moldability and homogeneity for plastic lens elements during the injection molding process.

According to the optical imaging lens assembly of the present disclosure, the lens elements thereof can be made of glass or plastic material. When the lens elements are made of glass material, the distribution of the refractive power of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the optical imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical imaging lens assembly of the present disclosure, the optical imaging lens assembly can include at least one stop, such as an aperture stop, a glare stop or a field stop. Said glare stop or said field stop is for eliminating the stray light and thereby improving the image resolution thereof.

According to the optical imaging lens assembly of the present disclosure, an aperture stop can be configured as a front stop or a middle stop. A front stop disposed between an imaged object and the first lens element can provide a longer distance between an exit pupil of the optical imaging lens assembly and the image plane and thereby improves the image-sensing efficiency of an image sensor. A middle stop disposed between the first lens element and the image plane is favorable for enlarging the field of view of the optical imaging lens assembly and thereby provides a wider field of view for the same.

According to the optical imaging lens assembly of the present disclosure, the optical imaging lens assembly is featured with good correction ability and high image quality, and can be applied to 3D (three-dimensional) image capturing applications, in products such as digital cameras, mobile devices, digital tablets, wearable devices and other portable electronic image systems.

According to the present disclosure, an image capturing device is provided. The image capturing device includes the optical imaging lens assembly according to the present disclosure, and an image sensor located on an image plane of the optical imaging lens assembly. Accordingly, it is favorable for correcting astigmatism and spherical aberration both in the paraxial region and the off-axis region of the optical imaging lens assembly and enhancing the correction ability of the optical imaging lens assembly so as to further improve the aberration correction ability of each lens element in the optical imaging lens assembly.

According to the above description of the present disclosure, the following 1st-9th specific embodiments are provided for further explanation.

1st Embodiment

Figure 2:
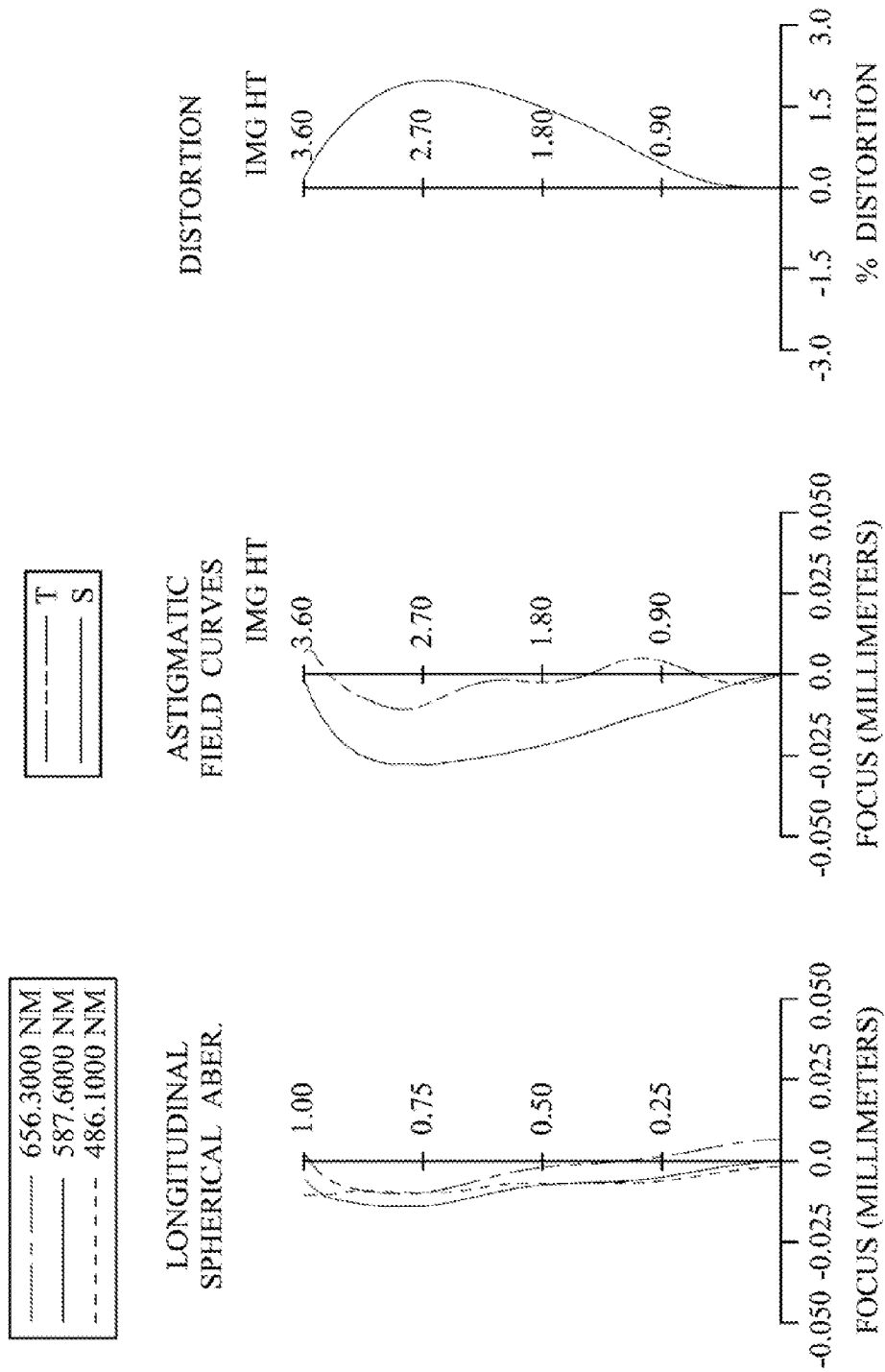
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. The image capturing device includes the optical imaging lens assembly (not otherwise herein labeled) of the present disclosure and an image sensor 190. FIG. 2 shows spherical aberration curves, astigmatic field curves and a distortion curve of the image capturing device according to the 1st embodiment. In FIG. 1, the optical imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170, wherein the optical imaging lens assembly has a total of six lens elements (110-160) with refractive power.

The first lens element 110 with positive refractive power has a convex object-side surface 111 and a concave image-side surface 112. The first lens element 110 is made of plastic material, and has the object-side surface 111 and the image-side surface 112 being both aspheric.

The second lens element 120 with negative refractive power has a concave object-side surface 121 and a convex image-side surface 122. The second lens element 120 is made of plastic material, and has the object-side surface 121 and the image-side surface 122 being both aspheric. Furthermore, both of the object-side surface 121 and the image-side surface 122 of the second lens element 120 have at least one inflection point.

The third lens element 130 with positive refractive power has a convex object-side surface 131 and a concave image-side surface 132. The third lens element 130 is made of plastic material, and has the object-side surface 131 and the image-side surface 132 being both aspheric. Furthermore, both of the object-side surface 131 and the image-side surface 132 of the third lens element 130 have at least one inflection point.

The fourth lens element 140 with negative refractive power has a concave object-side surface 141 and a convex image-side surface 142. The fourth lens element 140 is made of plastic material, and has the object-side surface 141 and the image-side surface 142 being both aspheric.

The fifth lens element 150 with positive refractive power has a convex object-side surface 151 and a convex image-side surface 152. The fifth lens element 150 is made of plastic material, and has the object-side surface 151 and the image-side surface 152 being both aspheric.

The sixth lens element 160 with negative refractive power has a concave object-side surface 161 and a concave image-side surface 162. The sixth lens element 160 is made of plastic material, and has the object-side surface 161 and the image-side surface 162 being both aspheric. Furthermore, both of the object-side surface 161 and the image-side surface 162 of the sixth lens element 160 have at least one inflection point.

FIG. 19 shows the tangent lines 162a and 162b of the image-side surface 162 of the sixth lens element 160 according to the optical imaging lens assembly of FIG. 1. In FIG. 19, the slope of the tangent line changes from positive (162a) to negative (162b) between a paraxial region and an off-axis region of the image-side surface 162 of the sixth lens element 160.

The IR-cut filter 180 is made of glass material and located between the sixth lens element 160 and the image plane 170, and will not affect the focal length of the optical imaging lens assembly. The image sensor 190 is disposed on an image plane 170 of the optical imaging lens assembly.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\sum_i (Ai)\times(Y^i)$$

, where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical imaging lens assembly according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=4.72 mm; Fno=2.20; and HFOV=37.3 degrees.

In the optical imaging lens assembly according to the 1st embodiment, when an Abbe number of the second lens element 120 is V2, an Abbe number of the fourth lens element 140 is V4, and an Abbe number of the fifth lens element 150 is V5, the following condition is satisfied: (V2+V4)/V5=0.77.

In the optical imaging lens assembly according to the 1st embodiment, when a central thickness of the second lens element 120 is CT2, a central thickness of the third lens element 130 is CT3, a central thickness of the fourth lens element 140 is CT4, and a central thickness of the fifth lens element 150 is CT5, the following condition is satisfied: (CT2+CT3+CT4)/CT5=0.99.

In the optical imaging lens assembly according to the 1st embodiment, when an axial distance between the third lens element 130 and the fourth lens element 140 is T34, and an axial distance between the fourth lens element 140 and the fifth lens element 150 is T45, the following condition is satisfied: T34/T45=2.67.

In the optical imaging lens assembly according to the 1st embodiment, when a curvature radius of the object-side surface 161 of the sixth lens element 160 is R11, a curvature radius of the image-side surface 162 of the sixth lens element 160 is R12, and a curvature radius of the image-side surface 152 of the fifth lens element 150 is R10, the following conditions are satisfied: (R11+R12)/(R11−R12)=0.03; and R10/R11=0.62.

In the optical imaging lens assembly according to the 1st embodiment, when a focal length of the second lens element 120 is f2, and a focal length of the sixth lens element 160 is f6, the following condition is satisfied: f6/f2=0.19.

In the optical imaging lens assembly according to the 1st embodiment, when twice a maximum image height of the optical imaging lens assembly is DI, an axial distance between the object-side surface 111 of the first lens element 110 and the image-side surface 162 of the sixth lens element 160 is Td, and an axial distance between the image-side surface 162 of the sixth lens element 160 and the image plane 170 is BL, the following condition is satisfied: DI/(Td+BL)=1.22.

In the optical imaging lens assembly according to the 1st embodiment, when an axial distance between the aperture stop 100 and the image-side surface 162 of the sixth lens element 160 is Sd, and the axial distance between the object-side surface 111 of the first lens element 110 and the image-side surface 162 of the sixth lens element 160 is Td, the following condition is satisfied: Sd/Td=0.94.

In the optical imaging lens assembly according to the 1st embodiment, when the axial distance between the object-side surface 111 of the first lens element 110 and the image-side surface 162 of the sixth lens element 160 is Td, and a curvature radius of the image-side surface 122 of the second lens element 120 is R4, the following condition is satisfied: Td/R4=−0.74.

The detailed optical data of the 1st embodiment are shown in Table 1 and the aspheric surface data are shown in Table 2 below.

TABLE 1

1st Embodiment
f = 4.72 mm, Fno = 2.20, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.270 | | | | |
| 2 | Lens 1 | 2.006 | ASP | 0.853 | Plastic | 1.544 | 55.9 | 3.71 |
| 3 | | 268.830 | ASP | 0.119 | | | | |
| 4 | Lens 2 | −3.254 | ASP | 0.250 | Plastic | 1.650 | 21.4 | −10.88 |
| 5 | | −6.216 | ASP | 0.362 | | | | |

TABLE 1-continued

1st Embodiment
f = 4.72 mm, Fno = 2.20, HFOV = 37.3 deg.

| Surface # | | Curvature Radius | Thickness | Material | Index | Abbe # | Focal Length |
|---|---|---|---|---|---|---|---|
| 6 | Lens 3 | 9.377 ASP | 0.405 | Plastic | 1.583 | 30.2 | 47.57 |
| 7 | | 13.938 ASP | 0.320 | | | | |
| 8 | Lens 4 | −2.455 ASP | 0.380 | Plastic | 1.650 | 21.4 | −8.63 |
| 9 | | −4.633 ASP | 0.120 | | | | |
| 10 | Lens 5 | 5.875 ASP | 1.046 | Plastic | 1.544 | 55.9 | 2.27 |
| 11 | | −1.467 ASP | 0.325 | | | | |
| 12 | Lens 6 | −2.358 ASP | 0.400 | Plastic | 1.530 | 55.8 | −2.08 |
| 13 | | 2.200 ASP | 0.500 | | | | |
| 14 | IR-cut filter | Plano | 0.200 | Glass | 1.517 | 64.2 | — |
| 15 | | Plano | 0.624 | | | | |
| 16 | Image | Plano | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | 3.6871E−02 | 2.0000E+01 | −2.2391E+01 | −2.2618E+01 | −1.0000E+00 | −1.0000E+00 |
| A4 = | −5.3212E−03 | −4.3410E−02 | −4.4127E−02 | 8.9072E−03 | −1.5405E−01 | −5.2981E−02 |
| A6 = | −1.0060E−02 | 2.4447E−03 | 1.2660E−01 | 7.6268E−02 | −2.2455E−02 | −4.4034E−02 |
| A8 = | 1.1355E−02 | −1.9758E−03 | −9,6297E−02 | −5.3462E−02 | 1.6668E−02 | 2.4843E−02 |
| A10 = | −2.2665E−02 | −3.2656E−02 | 2.1624E−02 | 2.4711E−02 | −5.6668E−04 | −5.6270E−03 |
| A12 = | 1.3284E−02 | 3.8932E−02 | 2.8060E−02 | −7.0541E−03 | −2.5428E−02 | −6.2729E−03 |
| A14 = | −4.8501E−03 | −1.3856E−02 | −1.3344E−02 | 4.2112E−03 | 1.8407E−02 | 3.9055E−03 |

| Surface # | 8 | 9 | 10 | 11 | 12 | 13 |
|---|---|---|---|---|---|---|
| k = | −3.7610E−01 | 2.8297E+00 | 1.0000E+00 | −3.1860E+00 | −1.2896E+00 | −1.1938E+01 |
| A4 = | 2.0901E−01 | 9.2815E−02 | −8.8135E−02 | −2.0978E−02 | −9.2876E−03 | −2.3303E−02 |
| A6 = | −1.7842E−01 | −6.9280E−02 | 4.4637E−02 | −9.8052E−04 | 7.3359E−03 | 4.7240E−03 |
| A8 = | 1.3106E−01 | 4.5307E−02 | −1.7225E−02 | 1.0032E−02 | −9.4763E−04 | −8.0255E−04 |
| A10 = | −7.7245E−02 | −2.0388E−02 | 3.3244E−03 | −4.2779E−03 | 1.9511E−05 | 8.2362E−05 |
| A12 = | 2.5111E−02 | 4.6775E−03 | −9.5675E−05 | 7.6069E−04 | 6.2281E−06 | −5.0288E−06 |
| A14 = | −3.6355E−03 | −4.0125E−04 | −2.9548E−05 | −5.1975E−05 | −4.2838E−07 | 1.4065E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
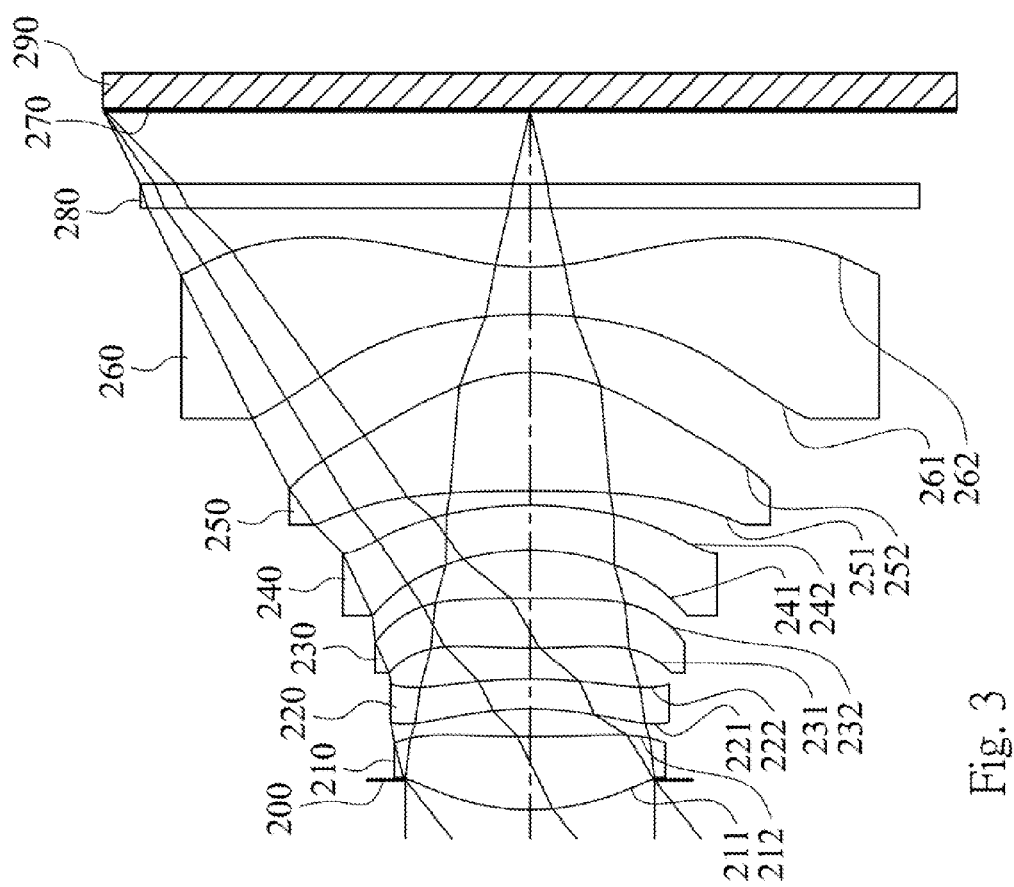
FIG. 3 is a schematic view of an image capturing device according to the 2nd embodiment of the present disclosure.
Figure 4:
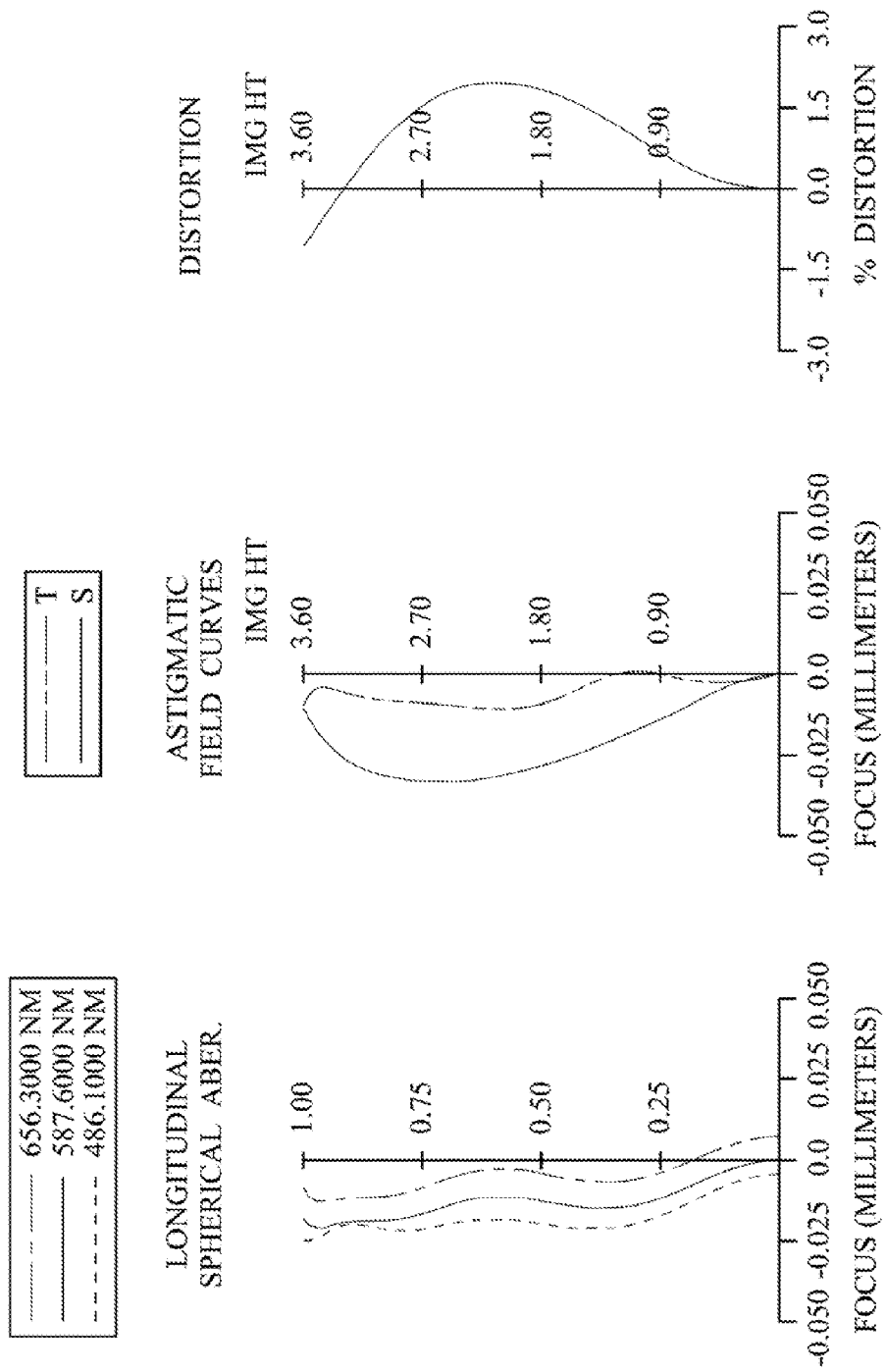
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. The image capturing device includes the optical imaging lens assembly (not otherwise herein labeled) of the present disclosure and an image sensor 290. FIG. 4 shows spherical aberration curves, astigmatic field curves and a distortion curve of the image capturing device according to the 2nd embodiment. In FIG. 3, the optical imaging lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280 and an image plane 270, wherein the optical imaging lens assembly has a total of six lens elements (210-260) with refractive power.

The first lens element 210 with positive refractive power has a convex object-side surface 211 and a concave image-side surface 212. The first lens element 210 is made of plastic material, and has the object-side surface 211 and the image-side surface 212 being both aspheric.

The second lens element 220 with negative refractive power has a concave object-side surface 221 and a convex image-side surface 222. The second lens element 220 is made of plastic material, and has the object-side surface 221 and the image-side surface 222 being both aspheric. Furthermore, both of the object-side surface 221 and the image-side surface 222 of the second lens element 220 have at least one inflection point.

The third lens element 230 with positive refractive power has a convex object-side surface 231 and a concave image-side surface 232. The third lens element 230 is made of plastic material, and has the object-side surface 231 and the image-side surface 232 being both aspheric. Furthermore, both of the object-side surface 231 and the image-side surface 232 of the third lens element 230 have at least one inflection point.

The fourth lens element 240 with negative refractive power has a concave object-side surface 241 and a convex image-side surface 242. The fourth lens element 240 is made of plastic material, and has the object-side surface 241 and the image-side surface 242 being both aspheric.

The fifth lens element 250 with positive refractive power has a concave object-side surface 251 and a convex image-side surface 252. The fifth lens element 250 is made of plastic material, and has the object-side surface 251 and the image-side surface 252 being both aspheric.

The sixth lens element 260 with negative refractive power has a concave object-side surface 261 and a concave image-side surface 262. The sixth lens element 260 is made of plastic material, and has the object-side surface 261 and the image-side surface 262 being both aspheric. Furthermore, both of the object-side surface 261 and the image-side surface 262 of the sixth lens element 260 have at least one inflection point. The slope of the tangent line changes from positive to negative between a paraxial region and an off-axis region of the image-side surface 262 of the sixth lens element 260. Please refer to FIG. 19 (exemplary figure), the exemplary figure for the present embodiment will not otherwise be provided herein.

The IR-cut filter 280 is made of glass material and located between the sixth lens element 260 and the image plane 270, and will not affect the focal length of the optical imaging lens assembly. The image sensor 290 is disposed on an image plane 270 of the optical imaging lens assembly.

The detailed optical data of the 2nd embodiment are shown in Table 3 and the aspheric surface data are shown in Table 4 below.

TABLE 3

2nd Embodiment
f = 4.63 mm, Fno = 2.20, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.250 | | | | |
| 2 | Lens 1 | 2.002 | ASP | 0.617 | Plastic | 1.544 | 55.9 | 4.42 |
| 3 | | 10.599 | ASP | 0.232 | | | | |
| 4 | Lens 2 | −2.893 | ASP | 0.250 | Plastic | 1.650 | 21.4 | −12.59 |
| 5 | | −4.628 | ASP | 0.263 | | | | |
| 6 | Lens 3 | 5.194 | ASP | 0.418 | Plastic | 1.543 | 56.5 | 10.01 |
| 7 | | 112.765 | ASP | 0.409 | | | | |
| 8 | Lens 4 | −1.956 | ASP | 0.380 | Plastic | 1.650 | 21.4 | −9.77 |
| 9 | | −3.044 | ASP | 0.122 | | | | |
| 10 | Lens 5 | −28.255 | ASP | 1.000 | Plastic | 1.530 | 55.8 | 2.86 |
| 11 | | −1.454 | ASP | 0.489 | | | | |
| 12 | Lens 6 | −3.937 | ASP | 0.400 | Plastic | 1.535 | 55.7 | −2.52 |
| 13 | | 2.120 | ASP | 0.500 | | | | |
| 14 | IR-cut filter | Plano | | 0.200 | Glass | 1.517 | 64.2 | |
| 15 | | Plano | | 0.624 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 2.8118E−02 | 2.0000E+01 | −2.0763E+01 | 8.0705E−01 | −1.0000E+00 | −1.0000E+00 |
| A4 = | −4.1757E−03 | −3.0686E−02 | −6.8485E−02 | −8.1796E−03 | −1.4208E−01 | −6.8289E−02 |
| A6 = | −1.3481E−02 | −1.3658E−02 | 1.1829E−01 | 7.2747E−02 | −4.8225E−03 | −6.3861E−02 |
| A8 = | 1.1310E−02 | −8.4581E−03 | −8.9939E−02 | −4.6420E−02 | −4.4279E−03 | 3.2062E−02 |
| A10 = | −2.1689E−02 | −3.7339E−02 | 2.4093E−02 | 2.8183E−02 | 5.5429E−03 | −6.0658E−03 |
| A12 = | 8.8458E−03 | 4.1486E−02 | 2.5489E−02 | −4.4163E−03 | −2.4885E−02 | −6.7352E−03 |
| A14 = | −4.8224E−03 | −1.2225E−02 | −1.1155E−02 | −7.9133E−04 | 1.2022E−02 | 2.8778E−03 |

| Surface # | 8 | 9 | 10 | 11 | 12 | 13 |
|---|---|---|---|---|---|---|
| k = | 8.2527E−01 | 1.6930E+00 | −1.0000E+00 | −2.2745E+00 | −1.2442E+00 | −8.4442E+00 |
| A4 = | 9.7106E−02 | 4.7438E−02 | −5.4957E−02 | −3.6636E−03 | −2.2823E−02 | −2.9610E−02 |
| A6 = | −1.5064E−01 | −6.5570E−02 | 3.7830E−02 | −4.5333E−03 | 4.1318E−03 | 5.8068E−03 |
| A8 = | 1.3543E−01 | 4.6498E−02 | −1.7623E−02 | 9.5549E−03 | −6.6638E−04 | −9.1805E−04 |
| A10 = | −7.5370E−02 | −1.9783E−02 | 3.2670E−03 | −4.2231E−03 | 7.5020E−05 | 8.6512E−05 |
| A12 = | 2.6390E−02 | 4.7277E−03 | −5.9095E−05 | 7.6804E−04 | 8.8946E−06 | −4.6676E−06 |
| A14 = | −3.7813E−03 | −3.0012E−04 | −2.3859E−05 | −5.5198E−05 | −1.3591E−06 | 1.2852E−07 |

In the optical imaging lens assembly according to the 2nd embodiment, the definitions of the following parameters are the same as those stated in the 1st embodiment with corresponding values for the 2nd embodiment. Moreover, these parameters can be calculated from Table 3 and Table 4 as the following values and satisfy the following conditions:

|  | 2nd Embodiment |  |  |
|---|---|---|---|
| f [mm] | 4.63 | (R11 + R12)/(R11 − R12) | 0.30 |
| Fno | 2.20 | R10/R11 | 0.37 |
| HFOV [deg.] | 38.3 | f6/f2 | 0.20 |
| (V2 + V4)/V5 | 0.77 | DI/(Td + BL) | 1.22 |
| (CT2 + CT3 + CT4)/CT5 | 1.05 | Sd/Td | 0.95 |
| T34/T45 | 3.35 | Td/R4 | −0.99 |

3rd Embodiment

Figure 5:
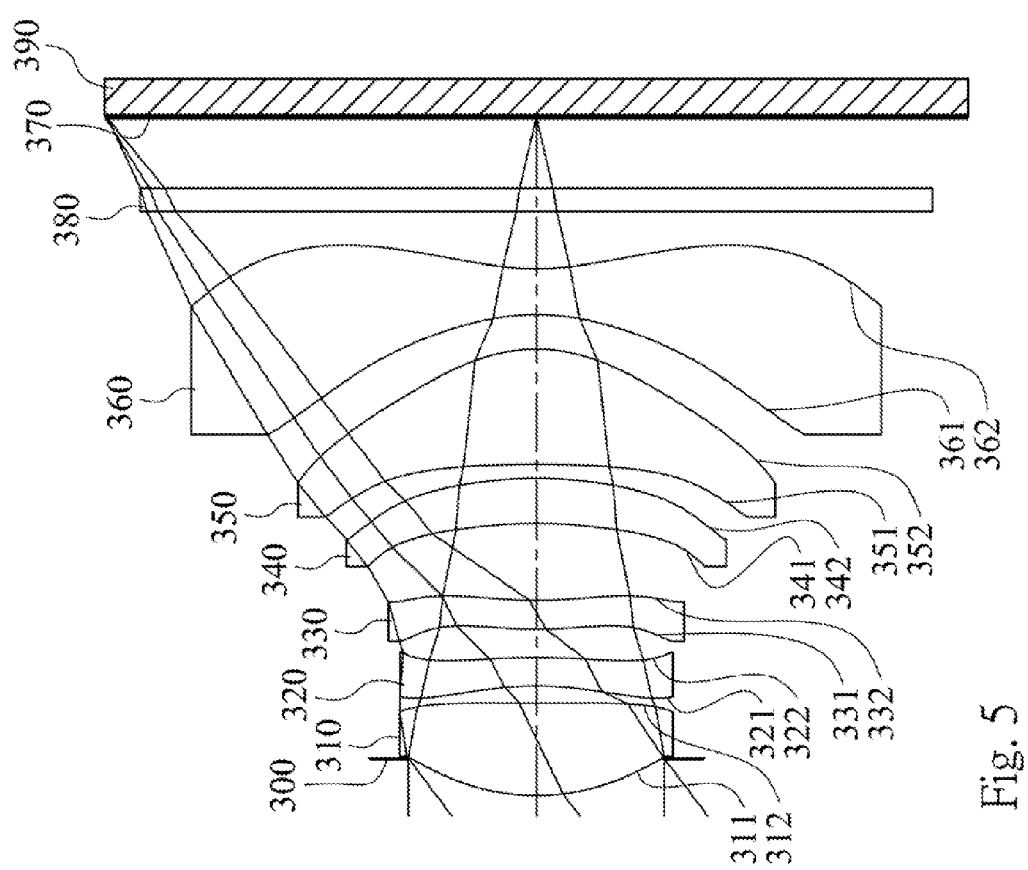
FIG. 5 is a schematic view of an image capturing device according to the 3rd embodiment of the present disclosure.
Figure 6:
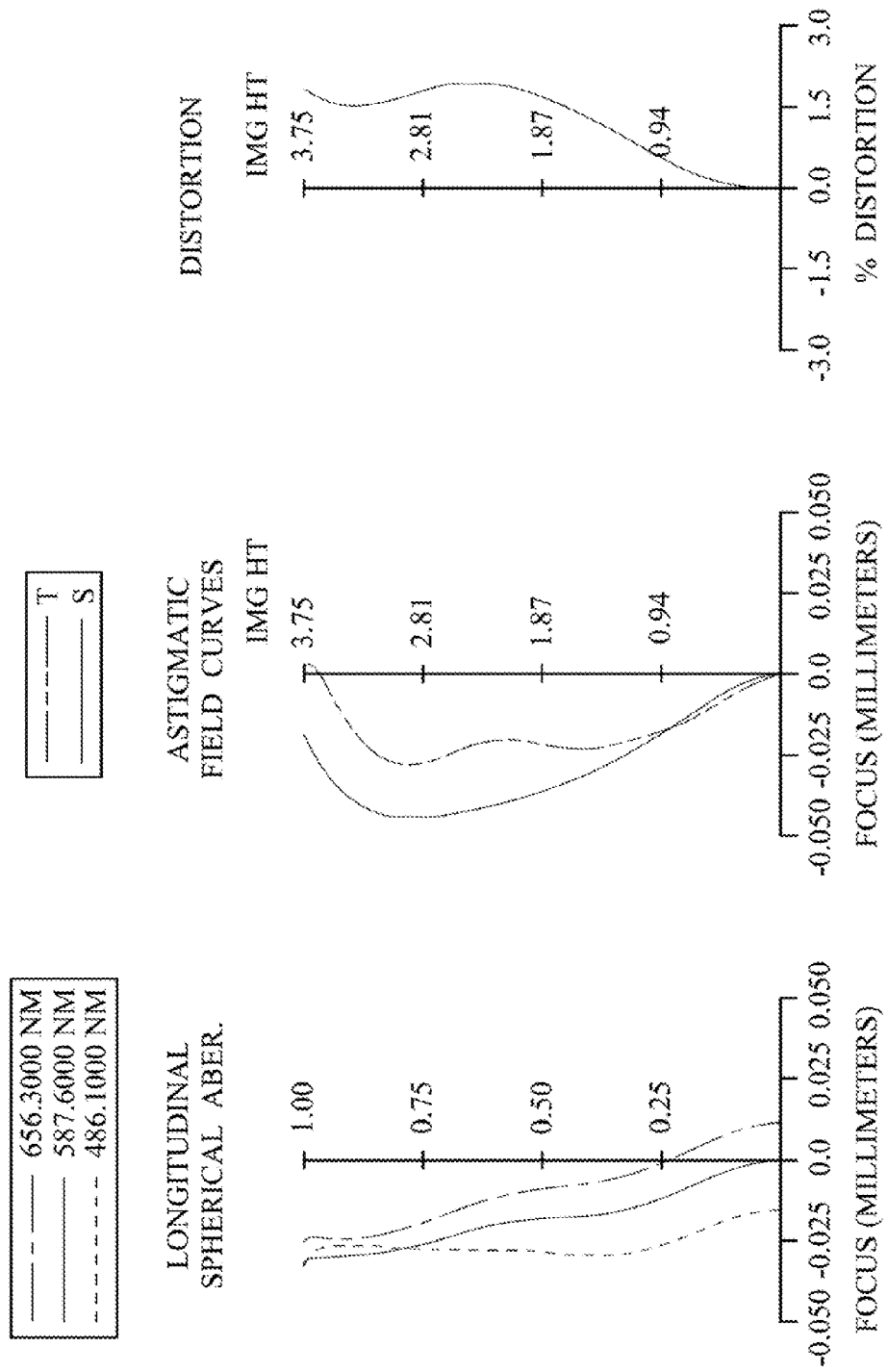
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. The image capturing device includes the optical imaging lens assembly (not otherwise herein labeled) of the present disclosure and an image sensor 390. FIG. 6 shows spherical aberration curves, astigmatic field curves and a distortion curve of the image capturing device according to the 3rd embodiment. In FIG. 5, the optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380 and an image plane 370, wherein the optical imaging lens assembly has a total of six lens elements (310-360) with refractive power.

The first lens element 310 with positive refractive power has a convex object-side surface 311 and a concave image-side surface 312. The first lens element 310 is made of plastic material, and has the object-side surface 311 and the image-side surface 312 being both aspheric.

The second lens element 320 with negative refractive power has a concave object-side surface 321 and a convex image-side surface 322. The second lens element 320 is made of plastic material, and has the object-side surface 321 and the image-side surface 322 being both aspheric. Furthermore, both of the object-side surface 321 and the image-side surface 322 of the second lens element 320 have at least one inflection point.

The third lens element 330 with positive refractive power has a convex object-side surface 331 and a concave image-side surface 332. The third lens element 330 is made of plastic material, and has the object-side surface 331 and the image-side surface 332 being both aspheric. Furthermore, both of the object-side surface 331 and the image-side surface 332 of the third lens element 330 have at least one inflection point.

The fourth lens element 340 with positive refractive power has a concave object-side surface 341 and a convex image-side surface 342. The fourth lens element 340 is made of plastic material, and has the object-side surface 341 and the image-side surface 342 being both aspheric.

The fifth lens element 350 with positive refractive power has a concave object-side surface 351 and a convex image-side surface 352. The fifth lens element 350 is made of plastic material, and has the object-side surface 351 and the image-side surface 352 being both aspheric.

The sixth lens element 360 with negative refractive power has a concave object-side surface 361 and a concave image-side surface 362. The sixth lens element 360 is made of plastic material, and has the object-side surface 361 and the image-side surface 362 being both aspheric. Furthermore, both of the object-side surface 361 and the image-side surface 362 of the sixth lens element 360 have at least one inflection point. The slope of the tangent line changes from positive to negative between a paraxial region and an off-axis region of the image-side surface 362 of the sixth lens element 360. Please refer to FIG. 19 (exemplary figure), the exemplary figure for the present embodiment will not otherwise be provided herein.

The IR-cut filter 380 is made of glass material and located between the sixth lens element 360 and the image plane 370, and will not affect the focal length of the optical imaging lens assembly. The image sensor 390 is disposed on an image plane 370 of the optical imaging lens assembly.

The detailed optical data of the 3rd embodiment are shown in Table 5 and the aspheric surface data are shown in Table 6 below.

TABLE 5

3rd Embodiment
f = 4.89 mm, Fno = 2.20, HFOV = 37.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.320 |  |  |  |  |
| 2 | Lens 1 | 1.924 | ASP | 0.797 | Plastic | 1.544 | 55.9 | 3.70 |
| 3 |  | 37.202 | ASP | 0.151 |  |  |  |  |
| 4 | Lens 2 | −2.765 | ASP | 0.250 | Plastic | 1.650 | 21.4 | −7.89 |
| 5 |  | −6.216 | ASP | 0.247 |  |  |  |  |
| 6 | Lens 3 | 3.534 | ASP | 0.247 | Plastic | 1.583 | 30.2 | 49.28 |
| 7 |  | 3.925 | ASP | 0.674 |  |  |  |  |
| 8 | Lens 4 | −3.635 | ASP | 0.388 | Plastic | 1.514 | 56.8 | 40.90 |
| 9 |  | −3.211 | ASP | 0.120 |  |  |  |  |
| 10 | Lens 5 | −15.540 | ASP | 1.004 | Plastic | 1.544 | 55.9 | 2.61 |
| 11 |  | −1.330 | ASP | 0.302 |  |  |  |  |
| 12 | Lens 6 | −2.009 | ASP | 0.400 | Plastic; | 1.530 | 55.8 | −2.02 |
| 13 |  | 2.454 | ASP | 0.500 |  |  |  |  |
| 14 | IR-cut filter | Plano |  | 0.200 | Glass | 1.517 | 64.2 | — |
| 15 |  | Plano |  | 0.623 |  |  |  |  |
| 16 | Image | Plano |  | — |  |  |  |  |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | 1.3060E−01 | 1.5696E+01 | −1.9448E+01 | −3.0000E+01 | −1.0000E+00 | −1.0000E+00 |
| A4 = | −2.9969E−03 | −3.0266E−02 | −3.6399E−02 | 1.9330E−02 | −1.7088E+01 | −9.1366E−02 |
| A6 = | −6.6889E−03 | −2.5600E−03 | 1.1648E−01 | 7.1065E−02 | −5.9412E−03 | −4.1859E−02 |
| A8 = | 1.0148E−02 | 5.6384E−03 | −9.5589E−02 | −5.5342E−02 | 9.4545E−03 | 3.7499E−02 |
| A10 = | −2.0359E−02 | −3.6514E−02 | 2.2403E−02 | 2.5577E−02 | 2.5710E−03 | −5.7535E−03 |
| A12 = | 1.4146E−02 | 31613E−02 | 2.5748E−02 | −5.4374E−03 | −2.2873E−02 | −6.8463E−03 |
| A14 = | −5.6077E−03 | −1.2804E−02 | −1.2143E−02 | 3.4471E−03 | 1.6194E−02 | 4.3012E−03 |

| Surface # | 8 | 9 | 10 | 11 | 12 | 13 |
|---|---|---|---|---|---|---|
| k = | 3.4201E+00 | 2.0083E+00 | −1.0000E+00 | −2.3214E+00 | −5.7094E+00 | −1.0578E+01 |
| A4 = | −1.0885E−01 | 8.0102E−02 | 4.8776E−02 | 1.5373E−03 | −2.3712E−02 | −2.6993E−02 |
| A6 = | −1.4035E−01 | −8.0786E−02 | 3.0846E−02 | −6.4290E−03 | 3.8046E−03 | 4.9816E−03 |
| A8 = | 1.2428E−01 | 4.4666E−02 | −1.7343E−02 | 9.0490E−03 | −7.5933E−04 | −8.6957E−04 |
| A10 = | −7.7604E−02 | −1.9777E−02 | 3.3923E−03 | −4.2314E−03 | 7.6815E−05 | 9.0143E−05 |
| A12 = | −2.6493E−02 | 4.8727E−03 | −6.8975E−05 | 7.8034E−04 | 1.0491E−05 | −5.3880E−06 |
| A14 = | −3.8335E−33 | −3.5274E−44 | −2.2248E−05 | −5.2537E−05 | −1.3909E−06 | 1.5137E−07 |

In the optical imaging lens assembly according to the 3rd embodiment, the definitions of the following parameters are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 4.89 | (R11 + R12)/(R11 − R12) | −0.10 |
| Fno | 2.20 | R10/R11 | 0.66 |
| HFOV [deg.] | 37.1 | f6/f2 | 0.26 |
| (V2 + V4)/V5 | 1.40 | DI/(Td + BL) | 1.27 |
| (CT2 + CT3 + CT4)/CT5 | 0.88 | Sd/Td | 0.93 |
| T34/T45 | 5.62 | Td/R4 | −0.74 |

4th Embodiment

Figure 7:
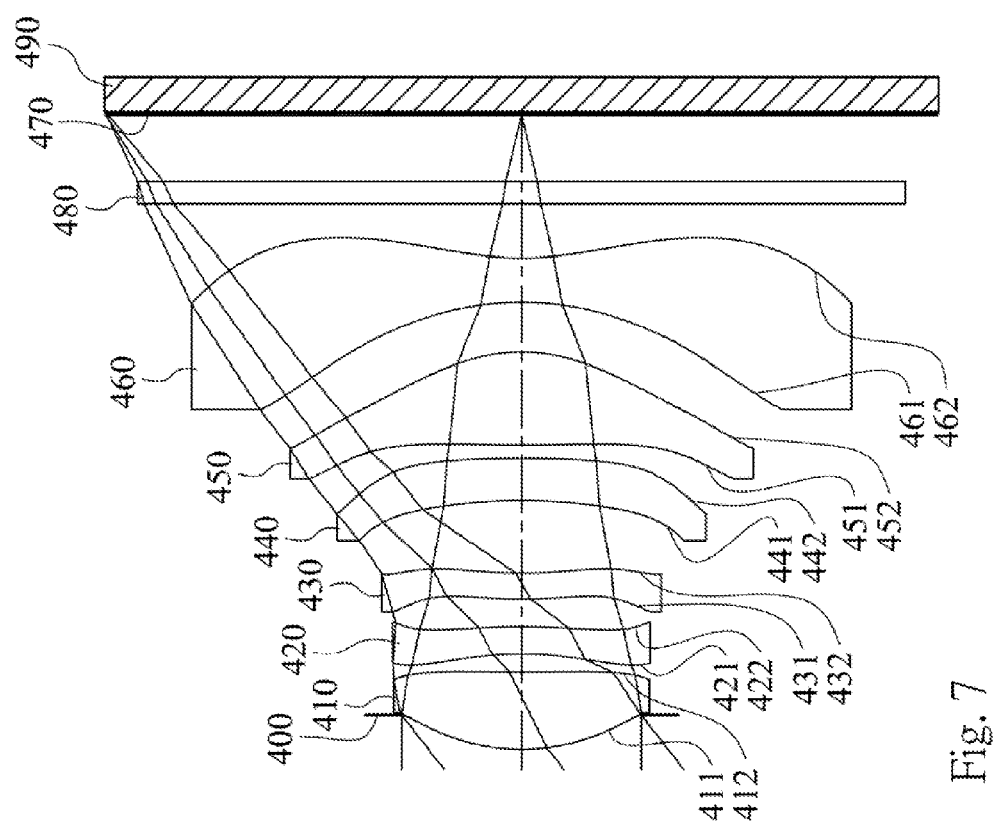
FIG. 7 is a schematic view of an image capturing device according to the 4th embodiment of the present disclosure.
Figure 8:
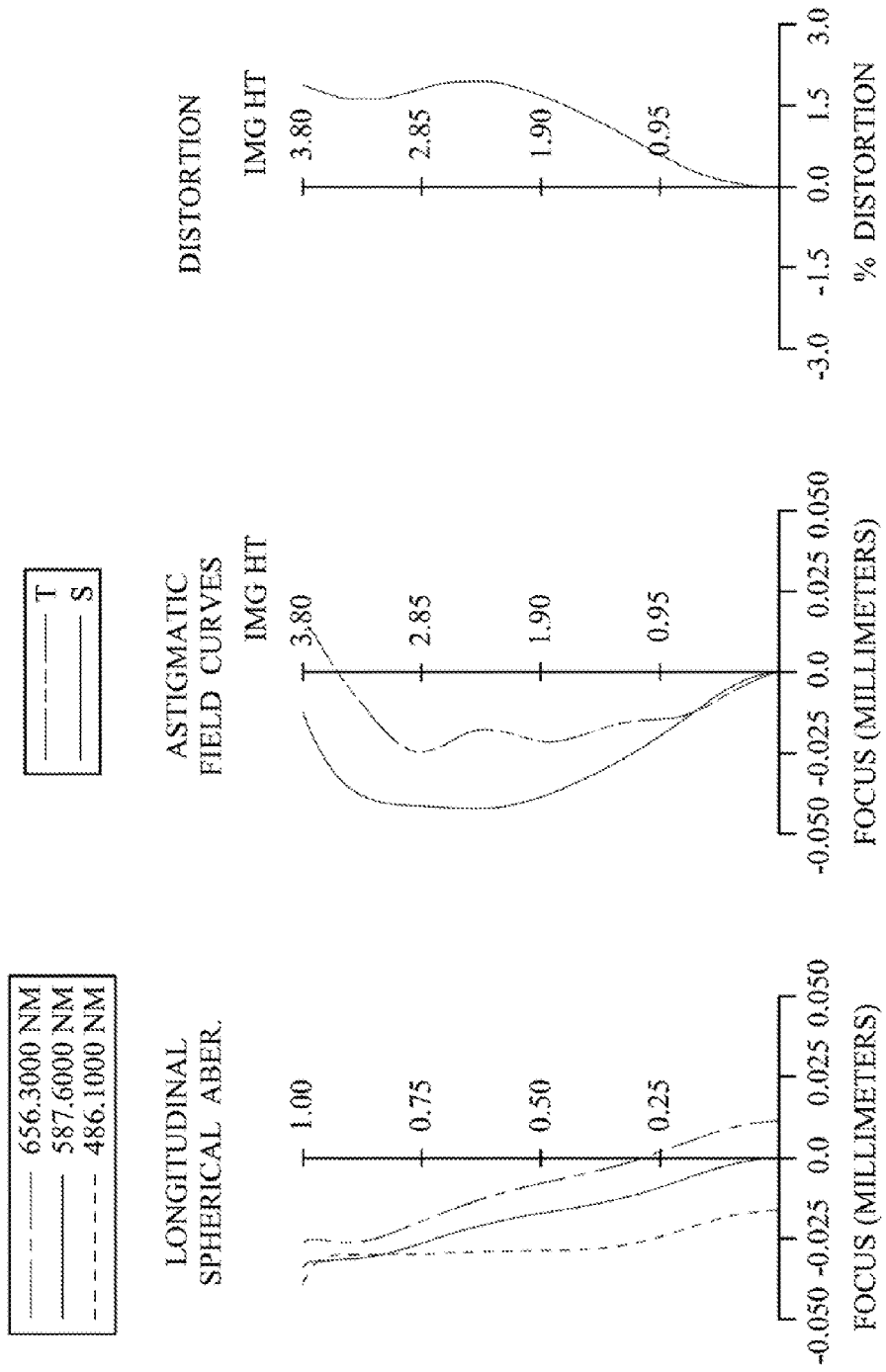
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. The image capturing device includes the optical imaging lens assembly (not otherwise herein labeled) of the present disclosure and an image sensor 490. FIG. 8 shows spherical aberration curves, astigmatic field curves and a distortion curve of the image capturing device according to the 4th embodiment. In FIG. 7, the optical imaging lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470, wherein the optical imaging lens assembly has a total of six lens elements (410-460) with refractive power.

The first lens element 410 with positive refractive power has a convex object-side surface 411 and a concave image-side surface 412. The first lens element 410 is made of plastic material, and has the object-side surface 411 and the image-side surface 412 being both aspheric.

The second lens element 420 with negative refractive power has a concave object-side surface 421 and a convex image-side surface 422. The second lens element 420 is made of plastic material, and has the object-side surface 421 and the image-side surface 422 being both aspheric. Furthermore, both of the object-side surface 421 and the image-side surface 422 of the second lens element 420 have at least one inflection point.

The third lens element 430 with positive refractive power has a convex object-side surface 431 and a concave image-side surface 432. The third lens element 430 is made of plastic material, and has the object-side surface 431 and the image-side surface 432 being both aspheric. Furthermore, both of the object-side surface 431 and the image-side surface 432 of the third lens element 430 have at least one inflection point.

The fourth lens element 440 with negative refractive power has a concave object-side surface 441 and a convex image-side surface 442. The fourth lens element 440 is made of plastic material, and has the object-side surface 441 and the image-side surface 442 being both aspheric.

The fifth lens element 450 with positive refractive power has a convex object-side surface 451 and a convex image-side surface 452. The fifth lens element 450 is made of plastic material, and has the object-side surface 451 and the image-side surface 452 being both aspheric.

The sixth lens element 460 with negative refractive power has a concave object-side surface 461 and a concave image-side surface 462. The sixth lens element 460 is made of plastic material, and has the object-side surface 461 and the image-side surface 462 being both aspheric. Furthermore, both of the object-side surface 461 and the image-side surface 462 of the sixth lens element 460 have at least one inflection point. The slope of the tangent line changes from positive to negative between a paraxial region and an off-axis region of the image-side surface 462 of the sixth lens element 460. Please refer to FIG. 19 (exemplary figure), the exemplary figure for the present embodiment will not otherwise be provided herein.

The IR-cut filter 480 is made of glass material and located between the sixth lens element 460 and the image plane 470, and will not affect the focal length of the optical imaging lens assembly. The image sensor 490 is disposed on an image plane 470 of the optical imaging lens assembly.

The detailed optical data of the 4th embodiment are shown in Table 7 and the aspheric surface data are shown in Table 8 below.

TABLE 7

4th Embodiment
f = 4.81 mm, Fno = 2.20, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.312 | | | | |
| 2 | Lens 1 | 1.887 | ASP | 6.706 | Plastic | 1.535 | 56.3 | 3.76 |
| 3 | | 27.116 | ASP | 0.168 | | | | |
| 4 | Lens 2 | −2.821 | ASP | 0.250 | Plastic | 1.650 | 21.4 | −8.19 |
| 5 | | −6.216 | ASP | 0.251 | | | | |
| 6 | Lens 3 | 3.603 | ASP | 0.234 | Plastic | 1.583 | 30.2 | 59.09 |
| 7 | | 3.927 | ASP | 0.669 | | | | |
| 8 | Leas 4 | −4.104 | ASP | 0.380 | Plastic | 1.514 | 56.8 | −14.83 |
| 9 | | −9.326 | ASP | 0.120 | | | | |
| 10 | Lens 5 | 13.315 | ASP | 0.850 | Plastic | 1.544 | 55.9 | 158 |
| 11 | | −1.531 | ASP | 0.459 | | | | |
| 12 | Lens 6 | −2.627 | ASP | 0.400 | Plastic | 1.530 | 55.8 | −2.41 |
| 13 | | 2.623 | ASP | 0.500 | | | | |
| 14 | IR-cut filter | Plano | | 0.200 | Glass | 1.517 | 64.2 | — |
| 15 | | Plano | | 0.622 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | 1.2111E−01 | 1.0925E+00 | −1.5247E+01 | −1.5247E+01 | −1.0000E+00 | −1.0000E+00 |
| A4 = | −2.6763E−03 | −2.6997E−02 | −3.5048E−02 | 1.8079E−02 | −1.7942E−01 | −9.5008E−02 |
| A6 = | −4.5031E−03 | −6.5160E−03 | 1.1066E−01 | 7.3167E−02 | −4.4163E−03 | −4.2336E−02 |
| A8 = | 5.6090E−03 | 8.3221E−03 | −8.8619E−02 | −5.4890E−02 | 1.4768E−03 | 3.8096E−02 |
| A10 = | −1.9444E−02 | −4.0519E−02 | 2.4384E−02 | 2.5694E−02 | 7.7249E−03 | −5.5924E−03 |
| A12 = | 1.6032E−02 | 3.7962E−02 | 2.0909E−02 | −2.9027E−03 | −1.9852E−02 | −5.3921E−03 |
| A14 = | −8.1694E−03 | −1.2610E−02 | −9.7794E−03 | 2.3518E−03 | 1.4779E−02 | 3.8300E−03 |

| Surface # | 8 | 9 | 10 | 11 | 12 | 13 |
|---|---|---|---|---|---|---|
| k = | 2.6495E+00 | 1.4473E+01 | −1.0000E+00 | −1.8234E+00 | −5.0082E+00 | −1.1029E+01 |
| A4 = | 8.3763E−02 | 2.7103E−02 | −5.2031E−02 | 1.6078E−02 | −2.4763E−02 | −2.8424E−02 |
| A6 = | −1.2699E−01 | −7.1879E−02 | 2.7139E−02 | −5.4619E−03 | 4.5795E−03 | 5.7723E−03 |
| A8 = | 1.2139E−01 | 4.2843E−02 | −1.6048E−02 | 8.6901E−03 | −7.0412E−04 | −1.0317E−03 |
| A10 = | −7.7920E−02 | −1.9712E−02 | 3.4354E−03 | −4.2541E−03 | 5.5755E−05 | 1.0007E−04 |
| A12 = | 2.6346E−02 | 4.9528E−03 | −8.9903E−05 | 7.9129E−04 | 7.6953E−06 | −4.9856E−06 |
| A14 = | −3.7381E−03 | −4.3496E−04 | −2.5631E−05 | −50050E−05 | −9.0949E−07 | 1.0046E−07 |

In the optical imaging lens assembly according to the 4th embodiment, the definitions of the following parameters are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 4.81 | (R11 + R12)/(R11 − R12) | 0.00 |
| Fno | 2.20 | R10/R11 | 0.58 |
| HFOV [deg.] | 37.9 | f6/f2 | 0.29 |
| (V2 + V4)/V5 | 1.40 | Dr/(Td + BL) | 1.31 |
| (CT2 + CT3 + CT4)/CT5 | 1.02 | Sd/Td | 0.93 |
| T34/T45 | 5.58 | Td/R4 | −0.72 |

5th Embodiment

Figure 9:
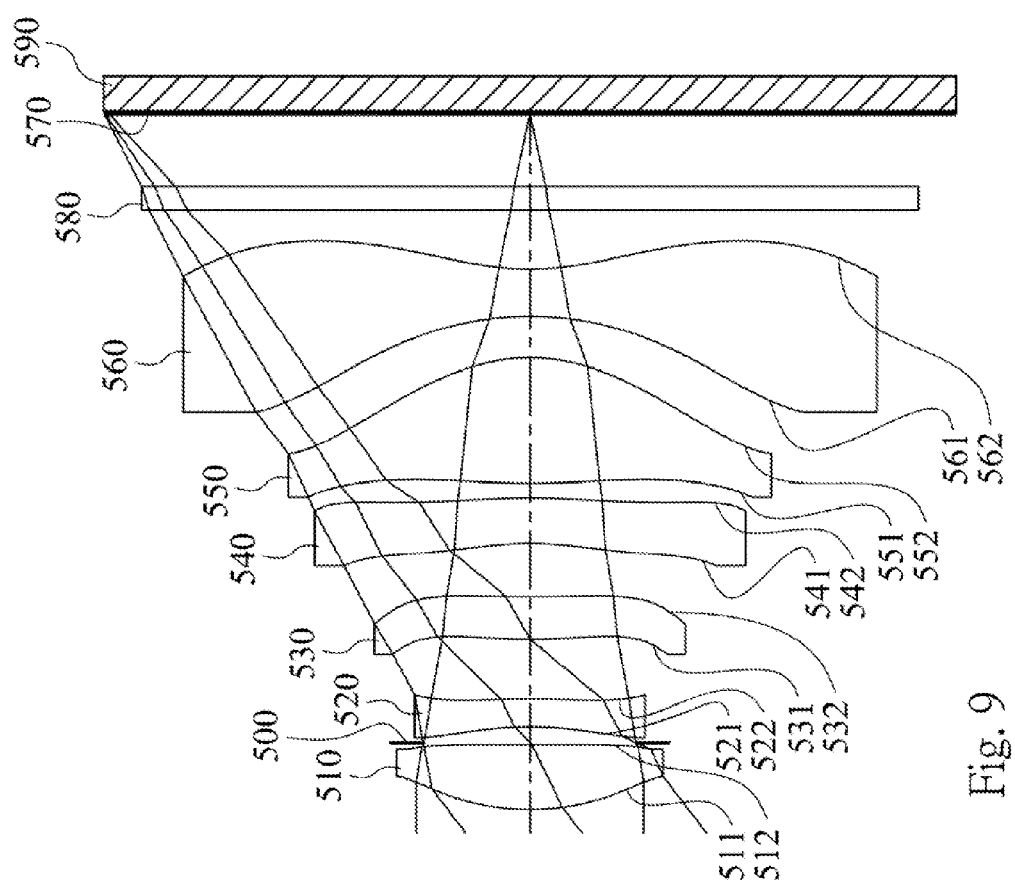
FIG. 9 is a schematic view of an image capturing device according to the 5th embodiment of the present disclosure.
Figure 10:
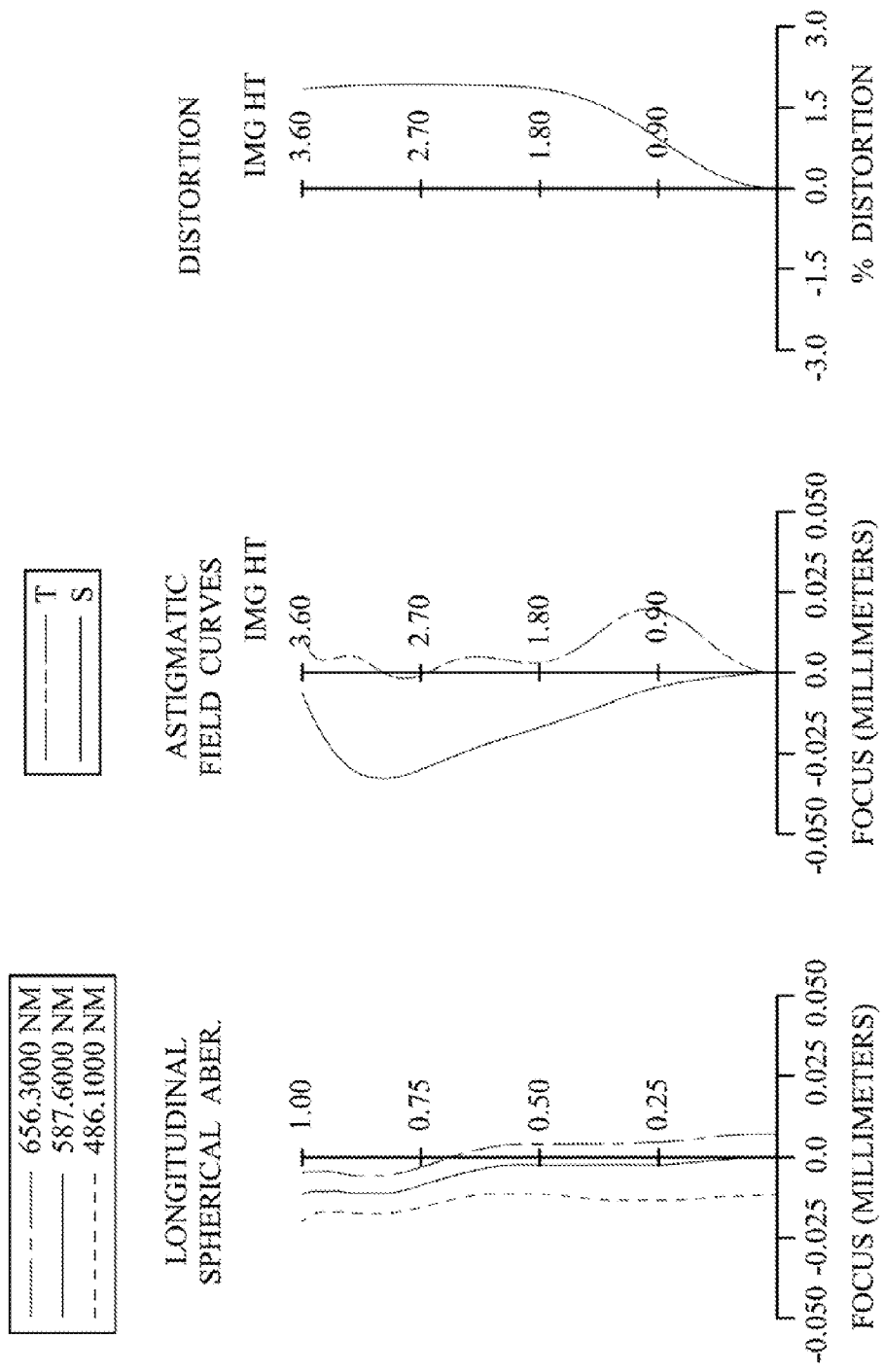
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. The image capturing device includes the optical imaging lens assembly (not otherwise herein labeled) of the present disclosure and an image sensor 590. FIG. 10 shows spherical aberration curves, astigmatic field curves and a distortion curve of the image capturing device according to the 5th embodiment. In FIG. 9, the optical imaging lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580 and an image plane 570, wherein the optical imaging lens assembly has a total of six lens elements (510-560) with refractive power.

The first lens element 510 with positive refractive power has a convex object-side surface 511 and a concave image-side surface 512. The first lens element 510 is made of glass material, and has the object-side surface 511 and the image-side surface 512 being both aspheric.

The second lens element 520 with negative refractive power has a concave object-side surface 521 and a convex image-side surface 522. The second lens element 520 is made of plastic material, and has the object-side surface 521 and the image-side surface 522 being both aspheric. Furthermore, both of the object-side surface 521 and the image-side surface 522 of the second lens element 520 have at least one inflection point.

The third lens element 530 with positive refractive power has a convex object-side surface 531 and a concave image-side surface 532. The third lens element 530 is made of plastic material, and has the object-side surface 531 and the image-side surface 532 being both aspheric. Furthermore, both of the object-side surface 531 and the image-side surface 532 of the third lens element 530 have at least one inflection point.

The fourth lens element 540 with negative refractive power has a concave object-side surface 541 and a convex image-side surface 542. The fourth lens element 540 is made of plastic material, and has the object-side surface 541 and the image-side surface 542 being both aspheric.

The fifth lens element 550 with positive refractive power has a convex object-side surface 551 and a convex image-side surface 552. The fifth lens element 550 is made of plastic material, and has the object-side surface 551 and the image-side surface 552 being both aspheric.

The sixth lens element 560 with negative refractive power has a concave object-side surface 561 and a concave image-side surface 562. The sixth lens element 560 is made of plastic material, and has the object-side surface 561 and the image-side surface 562 being both aspheric. Furthermore, both of the object-side surface 561 and the image-side surface 562 of the sixth lens element 560 have at least one inflection point. The slope of the tangent line changes from positive to negative between a paraxial region and an off-axis region of the image-side surface 562 of the sixth lens element 560. Please refer to FIG. 19 (exemplary figure), the exemplary figure for the present embodiment will not otherwise be provided herein.

The IR-cut filter 580 is made of glass material and located between the sixth lens element 560 and the image plane 570, and will not affect the focal length of the optical imaging lens assembly. The image sensor 590 is disposed on an image plane 570 of the optical imaging lens assembly.

The detailed optical data of the 5th embodiment are shown in Table 9 and the aspheric surface data are shown in Table 10 below.

TABLE 9

5th Embodiment
f = 4.62 mm, Fno = 2.40, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.020 | ASP | 0.549 | Glass | 1.533 | 46.5 | 3.62 |
| 2 | | 43.295 | ASP | 0.016 | | | | |
| 3 | Ape. Stop | Plano | | 0.136 | | | | |
| 4 | Lens 2 | −2.865 | ASP | 0.230 | Plastic | 1.640 | 23.3 | −6.66 |
| 5 | | −9.019 | ASP | 0.512 | | | | |
| 6 | Lens 3 | 5.030 | ASP | 0.359 | Plastic | 1.543 | 56.5 | 12.97 |
| 7 | | 17.121 | ASP | 0.453 | | | | |
| 8 | Lens 4 | −2.547 | ASP | 0.384 | Plastic | 1.583 | 30.2 | −8.30 |
| 9 | | −5.670 | ASP | 0.121 | | | | |
| 10 | Lens 5 | 5.791 | ASP | 1.066 | Plastic | 1.544 | 55.9 | 2.33 |
| 11 | | −1.516 | ASP | 0.352 | | | | |
| 12 | Lens 6 | −2.747 | ASP | 0.400 | Plastic | 1.530 | 55.8 | −2.24 |
| 13 | | 2.193 | ASP | 0.500 | | | | |
| 14 | IR-cut filter | Plano | | 0.200 | Glass | 1.517 | 64.2 | — |
| 15 | | Plano | | 0.624 | | | | |
| 16 | Image | Plano | | — | | | | |

Note:
Reference wavelength is 587.6 nm (d-line).

TABLE 10

| Aspheric Coefficients | | | | | | |
|---|---|---|---|---|---|---|
| Surface # | 1 | 2 | 4 | 5 | 6 | 7 |
| k = | 1.2453E−01 | −3.0000E+01 | −1.6164E+01 | −2.9998E+01 | −1.0000E+00 | −1.0000E+00 |
| A4 = | −3.1046E−03 | −3.8627E−02 | −2.6982E−02 | 6.1196E−02 | −8.7459E−02 | −1.8601E−02 |
| A6 = | −4.9178E−03 | 6.2183E−03 | 1.2777E−01 | 6.9279E−02 | 4.1674E−02 | −5.9145E−02 |
| A8 = | 3.8553E−03 | 9.5589E−03 | −1.0196E−01 | −6.5360E−02 | 1.5987E−02 | 1.7949E−02 |
| A10 = | −1.9826E−02 | −3.7842E−02 | 1.2044E−01 | 1.7171E−02 | −8.6112E−03 | −7.0558E−03 |
| A12 = | 1.4369E−02 | 2.0282E−02 | 3.5533E−02 | 2.0096E−02 | −2.5137E−02 | −6.7490E−03 |
| A14 = | −1.0518E−02 | −4.7810E−03 | −1.2953E−02 | −9.5586E−03 | 1.7065E−02 | 4.5649E−03 |
| Surface # | 8 | 9 | 10 | 11 | 12 | 13 |
| k = | −3.1361E−01 | −5.1729E+00 | −1.0000E+00 | −2.8874E+00 | −1.0002E+00 | −8.8690E+00 |
| A4 = | 2.0222E−01 | 8.7801E−02 | −8.4089E−02 | −1.8531E−02 | −7.8649E−02 | −2.9127E−02 |
| A6 = | −1.6748E−01 | −6.9285E−02 | 4.4322E−02 | −2.6695E−02 | 8.0212E−03 | 5.6605E−03 |
| A8 = | 1.3318E−01 | 4.5868E−02 | −1.7273E−02 | 9.8818E−03 | −8.8939E−04 | −8.7275E−04 |
| A10 = | −7.8444E−02 | −2.0059E−02 | 3.2471E−03 | −4.2451E−03 | 2.3094E−05 | 8.5112E−05 |
| A12 = | 2.4918E−02 | 4.6762E−03 | −1.1164E−04 | 7.7044E−04 | 6.4401E−06 | −4.9633E−06 |
| A14 = | −3.1831E−03 | −4.5462E−04 | −2.9297E−05 | −5.0061E−05 | −4.3389E−07 | 1.3490E−07 |

In the optical imaging lens assembly according to the 5th embodiment, the definitions of the following parameters are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 4.62 | (R11 + R12)/(R11 − R12) | 0.11 |
| Fno | 2.40 | R10/R11 | 0.55 |
| HFOV [deg.] | 37.5 | f6/f2 | 0.34 |
| (V2 + V4)/V5 | 0.96 | DI/(Td + BL) | 1.22 |
| (CT2 + CT3 + CT4)/CT5 | 0.91 | Sd/Td | 0.88 |
| T34/T45 | 3.74 | Td/R4 | −0.51 |

6th Embodiment

Figure 11:
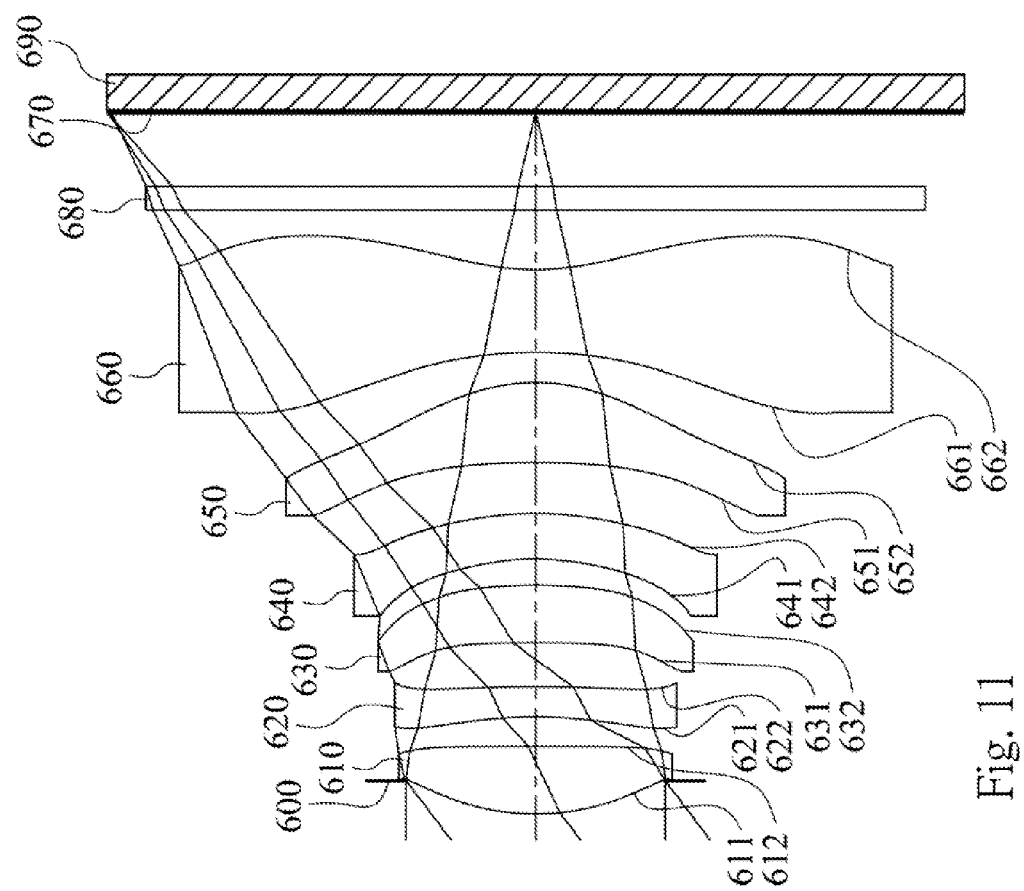
FIG. 11 is a schematic view of an image capturing device according to the 6th embodiment of the present disclosure.
Figure 12:
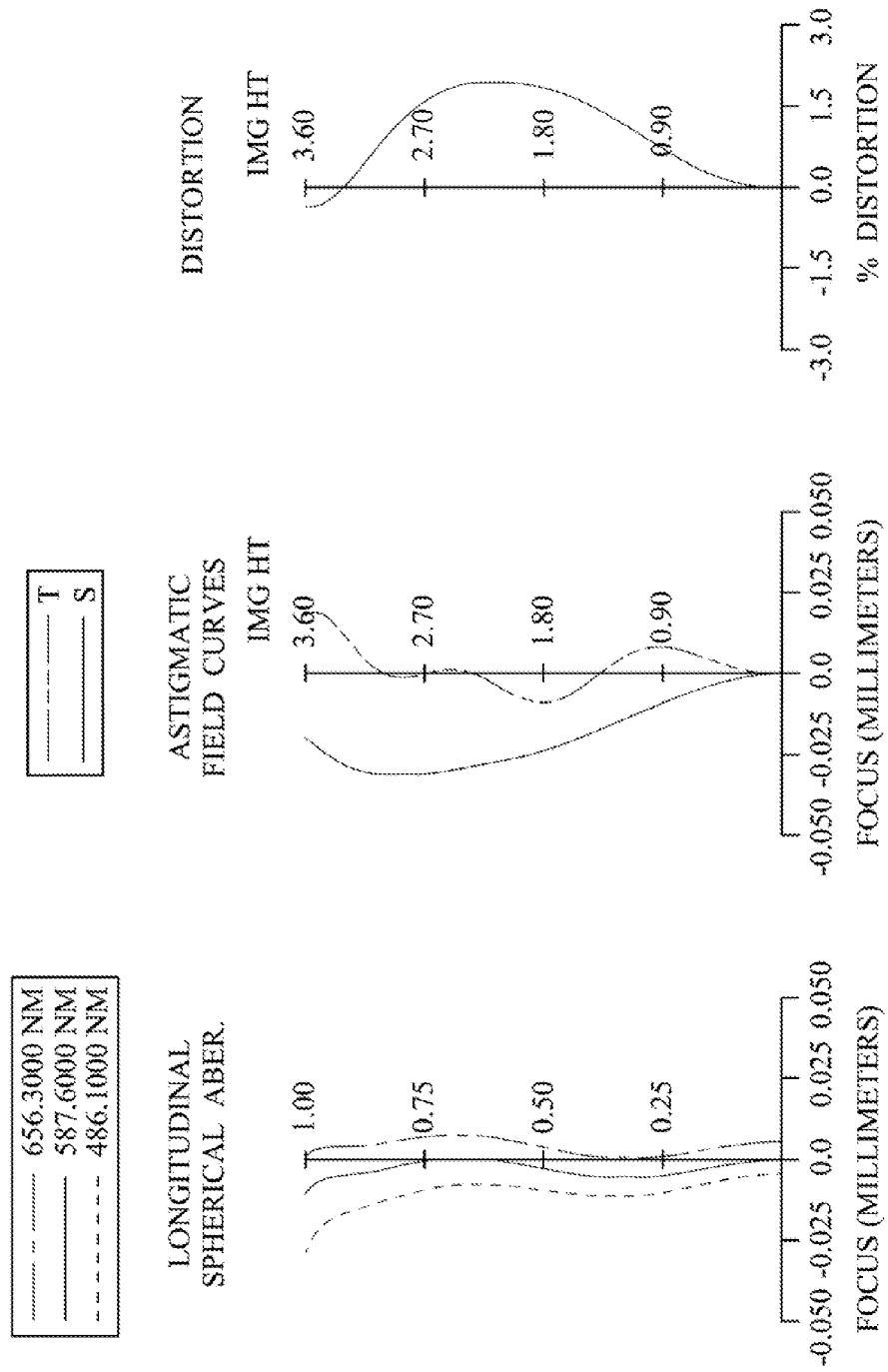
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. The image capturing device includes the optical imaging lens assembly (not otherwise herein labeled) of the present disclosure and an image sensor 690. FIG. 12 shows spherical aberration curves, astigmatic field curves and a distortion curve of the image capturing device according to the 6th embodiment. In FIG. 11, the optical imaging lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670, wherein the optical imaging lens assembly has a total of six lens elements (610-660) with refractive power.

The first lens element 610 with positive refractive power has a convex object-side surface 611 and a concave image-side surface 612. The first lens element 610 is made of plastic material, and has the object-side surface 611 and the image-side surface 612 being both aspheric.

The second lens element 620 with negative refractive power has a concave object-side surface 621 and a convex image-side surface 622. The second lens element 620 is made of plastic material, and has the object-side surface 621 and the image-side surface 622 being both aspheric. Furthermore, both of the object-side surface 621 and the image-side surface 622 of the second lens element 620 have at least one inflection point.

The third lens element 630 with positive refractive power has a concave object-side surface 631 and a convex image-side surface 632. The third lens element 630 is made of plastic material, and has the object-side surface 631 and the image-side surface 632 being both aspheric. Furthermore, the object-side surface 631 of the third lens element 630 has at least one inflection point.

The fourth lens element 640 with negative refractive power has a concave object-side surface 641 and a convex image-side surface 642. The fourth lens element 640 is made of plastic material, and has the object-side surface 641 and the image-side surface 642 being both aspheric.

The fifth lens element 650 with positive refractive power has a concave object-side surface 651 and a convex image-side surface 652. The fifth lens element 650 is made of plastic material, and has the object-side surface 651 and the image-side surface 652 being both aspheric.

The sixth lens element 660 with negative refractive power has a concave object-side surface 661 and a concave image-side surface 662. The sixth lens element 660 is made of plastic material, and has the object-side surface 661 and the image-side surface 662 being both aspheric. Furthermore, both of the object-side surface 661 and the image-side surface 662 of the sixth lens element 660 have at least one inflection point. The slope of the tangent line changes from positive to negative between a paraxial region and an off-axis region of the image-side surface 662 of the sixth lens element 660. Please refer to FIG. 19 (exemplary figure), the exemplary figure for the present embodiment will not otherwise be provided herein.

The IR-cut filter 680 is made of glass material and located between the sixth lens element 660 and the image plane 670, and will not affect the focal length of the optical imaging lens assembly. The image sensor 690 is disposed on an image plane 670 of the optical imaging lens assembly.

The detailed optical data of the 6th embodiment are shown in Table 11 and the aspheric surface data are shown in Table 12 below.

TABLE 11

6th Embodiment
f = 4.79, Fno = 2.20, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.280 | | | | |
| 2 | Lens 1 | 1.987 | ASP | 0.567 | Plastic | 1.544 | 55.9 | 3.69 |
| 3 | | 160.128 | ASP | 0.250 | | | | |
| 4 | Lens 2 | −3.656 | ASP | 0.250 | Plastic | 1.639 | 23.5 | −8.75 |
| 5 | | −10.855 | ASP | 0.372 | | | | |
| 6 | Lens 3 | −43.290 | ASP | 0.483 | Plastic | 1.544 | 55.9 | 8.41 |
| 7 | | −4.155 | ASP | 0.220 | | | | |
| 8 | Lens 4 | −1.997 | ASP | 0.386 | Plastic | 1.650 | 21.4 | −16.30 |
| 9 | | −2.649 | ASP | 0.424 | | | | |
| 10 | Lens 5 | −8.233 | ASP | 0.677 | Plastic | 1.544 | 55.9 | 3.44 |
| 11 | | −1.568 | ASP | 0.250 | | | | |
| 12 | Lens 6 | −3.875 | ASP | 0.700 | Plastic | 1.530 | 55.8 | −2.46 |
| 13 | | 2.087 | ASP | 0.500 | | | | |
| 14 | IR-cut filter | Plano | | 0.200 | Glass | 1.517 | 64.2 | — |
| 15 | | Plano | | 0.627 | | | | |
| 16 | Image | Plano | | | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 6.8139E−02 | 2.0000E+01 | −3.0000E+01 | −7.9273E+00 | −1.0000E+00 | −1.0000E+00 |
| A4 = | −5.5607E−03 | −1.9454E−02 | −5.4471E−02 | −2.3141E−03 | −1.0993E−01 | −2.2038E−02 |
| A6 = | −5.8948E−03 | 1.6994E−03 | 1.1790E−01 | 6.2324E−02 | −1.2038E−02 | −5.3932E−02 |
| A8 = | 7.6275E−03 | 8.3283E−03 | 9.6303E−02 | −5.9846E−02 | 1.2272E−02 | 2.9640E−02 |
| A10 = | −2.0899E−02 | −4.0194E−02 | 2.1225E−02 | 2.6985E−02 | 4.9687E−03 | −7.7980E−03 |
| A12 = | 1.4793E−02 | 3.0401E−02 | 2.6305E−02 | −7.5146E−04 | −2.6234E−02 | −7.8394E−03 |
| A14 = | −7.5868E−03 | −9.1370E−03 | −1.1023E−02 | 1.8178E−03 | 1.5410E−02 | 3.3780E−03 |

| Surface # | 8 | 9 | 10 | 11 | 12 | 13 |
|---|---|---|---|---|---|---|
| k = | 5.7673E−01 | 1.5589E+00 | −1.0000E+00 | −1.4956E+00 | −2.2150E+00 | −7.2682E+00 |
| A4 = | 1.5616E−01 | 9.4293E−02 | −5.9058E−02 | 1.4409E−02 | −1.8903E−02 | −2.8623E−02 |
| A6 = | −1.6331E−01 | −7.6855E−02 | 3.5672E−02 | −1.1248E−05 | 8.0020E−03 | 5.5823E−03 |
| A8 = | 1.2673E−01 | 4.4180E−02 | −1.6144E−02 | 8.5795E−03 | −8.7211E−04 | −8.4867E−04 |
| A10 = | −7.8595E−02 | −1.9101E−02 | 3.2502E−03 | −4.2629E−03 | 1.7417E−05 | 8.0675E−05 |
| A12 = | 2.5750E−02 | 5.2105E−03 | −8.3226E−05 | 7.8585E−04 | 5.2924E−06 | −5.2073E−06 |
| A14 = | −3.5028E−03 | −2.1044E−04 | −2.6278E−05 | −5.3286E−05 | −3.9584E−07 | 1.9626E−07 |

In the optical imaging lens assembly according to the 6th embodiment, the definitions of the following parameters are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 4.79 | (R11 + R12)/(R11 − R12) | 0.30 |
| Fno | 2.20 | R10/R11 | 0.40 |
| HFOV [deg.] | 37.0 | f6/f2 | 0.28 |
| (V2 + V4)/V5 | 0.80 | DI/(Td + BL) | 1.22 |
| (CT2 + CT3 + CT4)/CT5 | 1.65 | Sd/Td | 0.94 |
| T34/T45 | 0.52 | Td/R4 | −0.42 |

7th Embodiment

Figure 13:
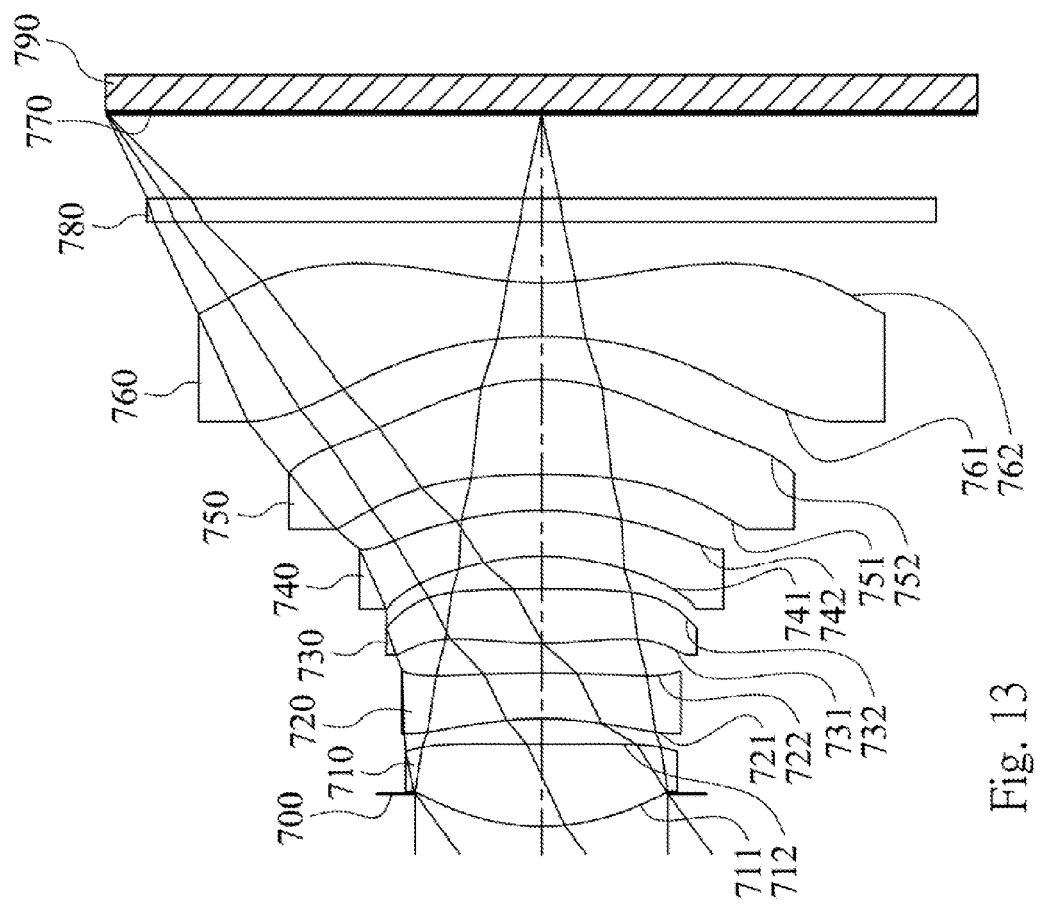
FIG. 13 is a schematic view of an image capturing device according to the 7th embodiment of the present disclosure.
Figure 14:
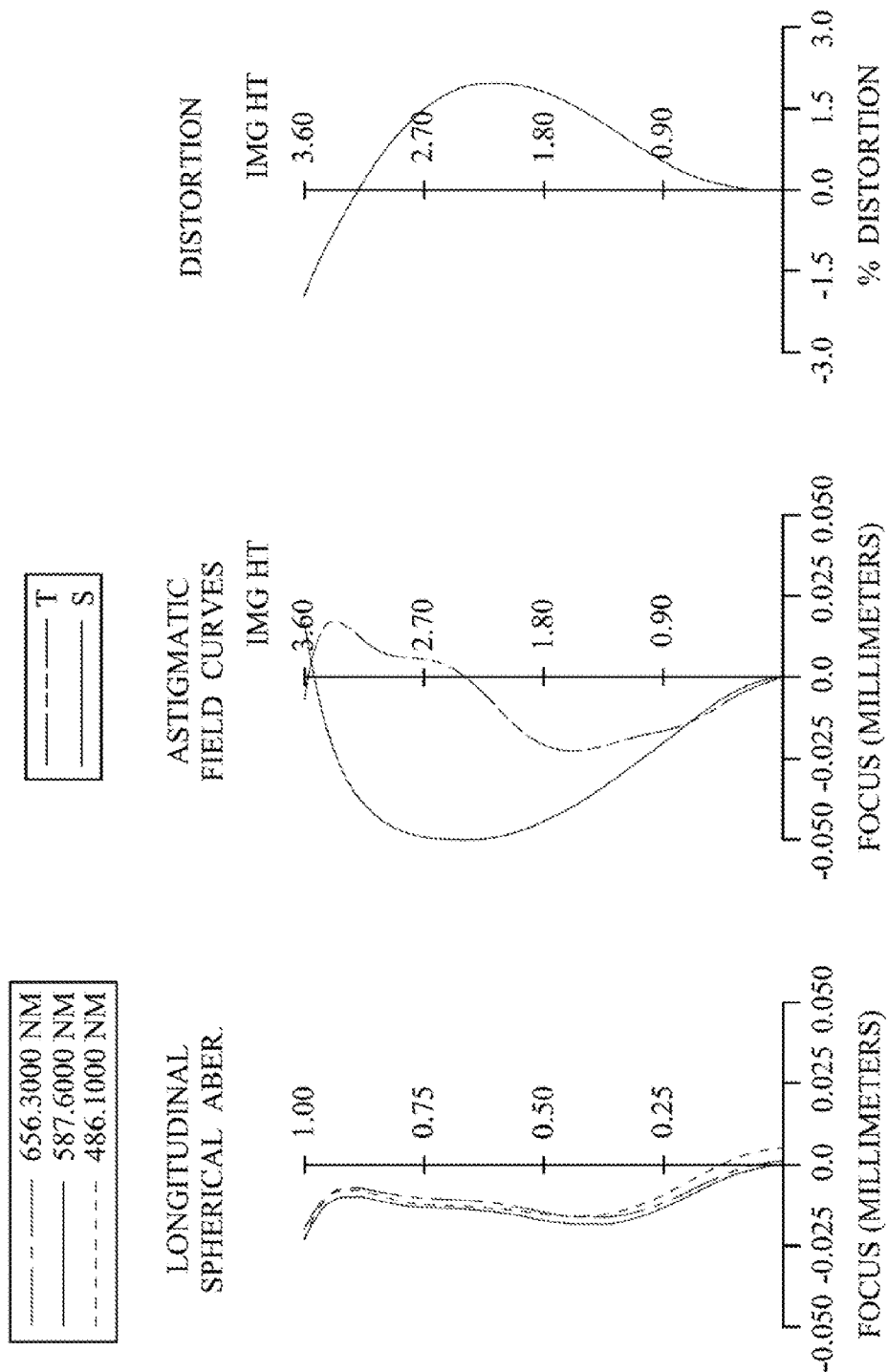
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. The image capturing device includes the optical imaging lens assembly (not otherwise herein labeled) of the present disclosure and an image sensor 790. FIG. 14 shows spherical aberration curves, astigmatic field curves and a distortion curve of the image capturing device according to the 7th embodiment. In FIG. 13, the optical imaging lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 780 and an image plane 770, wherein the optical imaging lens assembly has a total of six lens elements (710-760) with refractive power.

The first lens element 710 with positive refractive power has a convex object-side surface 711 and a concave image-side surface 712. The first lens element 710 is made of plastic material, and has the object-side surface 711 and the image-side surface 712 being both aspheric.

The second lens element 720 with negative refractive power has a concave object-side surface 721 and a convex image-side surface 722. The second lens element 720 is made of plastic material, and has the object-side surface 721 and the image-side surface 722 being both aspheric. Furthermore, both of the object-side surface 721 and the image-side surface 722 of the second lens element 720 have at least one inflection point.

The third lens element 730 with positive refractive power has a convex object-side surface 731 and a convex image-side surface 732. The third lens element 730 is made of plastic material, and has the object-side surface 731 and the image-side surface 732 being both aspheric. Furthermore, the object-side surface 731 of the third lens element 730 has at least one inflection point.

The fourth lens element 740 with negative refractive power has a concave object-side surface 741 and a convex image-side surface 742. The fourth lens element 740 is made of plastic material, and has the object-side surface 741 and the image-side surface 742 being both aspheric.

The fifth lens element 750 with positive refractive power has a concave object-side surface 751 and a convex image-side surface 752. The fifth lens element 750 is made of plastic material, and has the object-side surface 751 and the image-side surface 752 being both aspheric.

The sixth lens element 760 with negative refractive power has a concave object-side surface 761 and a concave image-side surface 762. The sixth lens element 760 is made of plastic material, and has the object-side surface 761 and the image-side surface 762 being both aspheric. Furthermore, both of the object-side surface 761 and the image-side surface 762 of the sixth lens element 760 have at least one inflection point. The slope of the tangent line changes from positive to negative between a paraxial region and an off-axis region of the image-side surface 762 of the sixth lens element 760. Please refer to FIG. 19 (exemplary figure), the exemplary figure for the present embodiment will not otherwise be provided herein.

The IR-cut filter 780 is made of glass material and located between the sixth lens element 760 and the image plane 770, and will not affect the focal length of the optical imaging lens assembly. The image sensor 790 is disposed on an image plane 770 of the optical imaging lens assembly.

The detailed optical data of the 7th embodiment are shown in Table 13 and the aspheric surface data are shown in Table 14 below.

TABLE 13

7th Embodiment
f = 5.01 mm, Fno = 2.40, HFOV = 36.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.270 | | | | |
| 2 | Lens 1 | 1.908 | ASP | 0.680 | Plastic | 1.543 | 56.5 | 3.67 |
| 3 | | 38.232 | ASP | 0.209 | | | | |
| 4 | Lens 2 | −3.056 | ASP | 0.380 | Plastic | 1.639 | 23.5 | −6.47 |
| 5 | | −12.254 | ASP | 0.248 | | | | |
| 6 | Lens 3 | 3.726 | ASP | 0.444 | Plastic | 1.530 | 55.8 | 5.93 |
| 7 | | −19.186 | ASP | 0.275 | | | | |
| 8 | Lens 4 | −1.878 | ASP | 0.380 | Plastic | 1.632 | 23.4 | −13.49 |
| 9 | | −2.597 | ASP | 0.293 | | | | |
| 10 | Lens 5 | −6.729 | ASP | 0.791 | Plastic | 1.544 | 55.9 | 4.20 |
| 11 | | −1.776 | ASP | 0.350 | | | | |
| 12 | Lens 6 | −3.681 | ASP | 0.449 | Plastic | 1.530 | 55.8 | −2.81 |
| 13 | | 2.614 | ASP | 0.500 | | | | |
| 14 | IR-cut filter | Plano | | 0.200 | Glass | 1.517 | 64.2 | — |
| 15 | | Plano | | 0.708 | | | | |
| 16 | Image | Plano | | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | 1.9671E−02 | 1.8159E+01 | −2.3895E+01 | 1.9982E+01 | −1.0000E+00 | −1.0000E+00 |
| A4 = | −6.1624E−03 | −2.3127E−02 | −5.6350E−02 | −1.6186E−02 | −1.2542E−01 | −1.5408E−02 |
| A6 = | −9.3806E−03 | −1.9956E−03 | 1.1552E−03 | 6.9865E−02 | −1.8111E−02 | −7.5667E−02 |
| A8 = | 1.0091E−02 | −2.8064E−03 | −9.8662E−02 | −5.4074E−02 | 6.3779E−03 | 2.9074E−02 |
| A10 = | −2.2053E−02 | −3.9005E−02 | 2.1842E−02 | 2.7104E−02 | 1.9466E−03 | −6.0222E−03 |
| A12 = | 1.2378E−02 | 3.5874E−02 | 2.8379E−02 | −4.3518E−03 | −2.5050E−02 | −7.6631E−03 |
| A14 = | −5.8264E−03 | −1.0073E−02 | −1.1922E−02 | 2.5670E−03 | 1.6085E−02 | 3.4876E−03 |

| Surface # | 8 | 9 | 10 | 11 | 12 | 13 |
|---|---|---|---|---|---|---|
| k = | 8.9130E−01 | 1.5943E+00 | −1.0000E+00 | −1.5232E+00 | −1.0002E+00 | −1.2579E+01 |
| A4 = | 1.6058E−01 | 8.5843E−02 | −5.8606E−02 | 1.6776E−02 | −2.6783E−02 | −3.0225E−02 |
| A6 = | −1.4360E−01 | −7.0767E−02 | 3.1859E−02 | −1.8888E−03 | 8.3666E−03 | 5.3147E−03 |
| A8 = | 1.2763E−01 | 4.5974E−02 | −1.6661E−02 | 8.4907E−03 | −7.9329E−04 | −8.2935E−04 |
| A10 = | −7.8736E−02 | −1.9302E−02 | 3.4636E−03 | −4.2817E−03 | 2.6178E−05 | 7.8508E−05 |
| A12 = | 2.6795E−02 | 5.1006E−03 | 1.8459E−05 | 7.8711E−04 | 5.6090E−06 | −5.2473E−06 |
| A14 = | −3.0103E−03 | −1.5507E−04 | −3.6905E−05 | −5.3697E−05 | −5.9509E−07 | 2.5025E−07 |

In the optical imaging lens assembly according to the 7th embodiment, the definitions of the following parameters are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 5.01 | (R11 + R12)/(R11 − R12) | 0.17 |
| Fno | 2.40 | R10/R11 | 0.48 |
| HFOV [deg.] | 36.3 | f6/f2 | 0.43 |
| (V2 + V4)/V5 | 0.84 | Dl/(Td + BL) | 1.22 |
| (CT2 + CT3 + CT4)/CT5 | 1.52 | Sd/Td | 0.94 |
| T34/T45 | 0.94 | Td/R4 | −0.37 |

8th Embodiment

Figure 15:
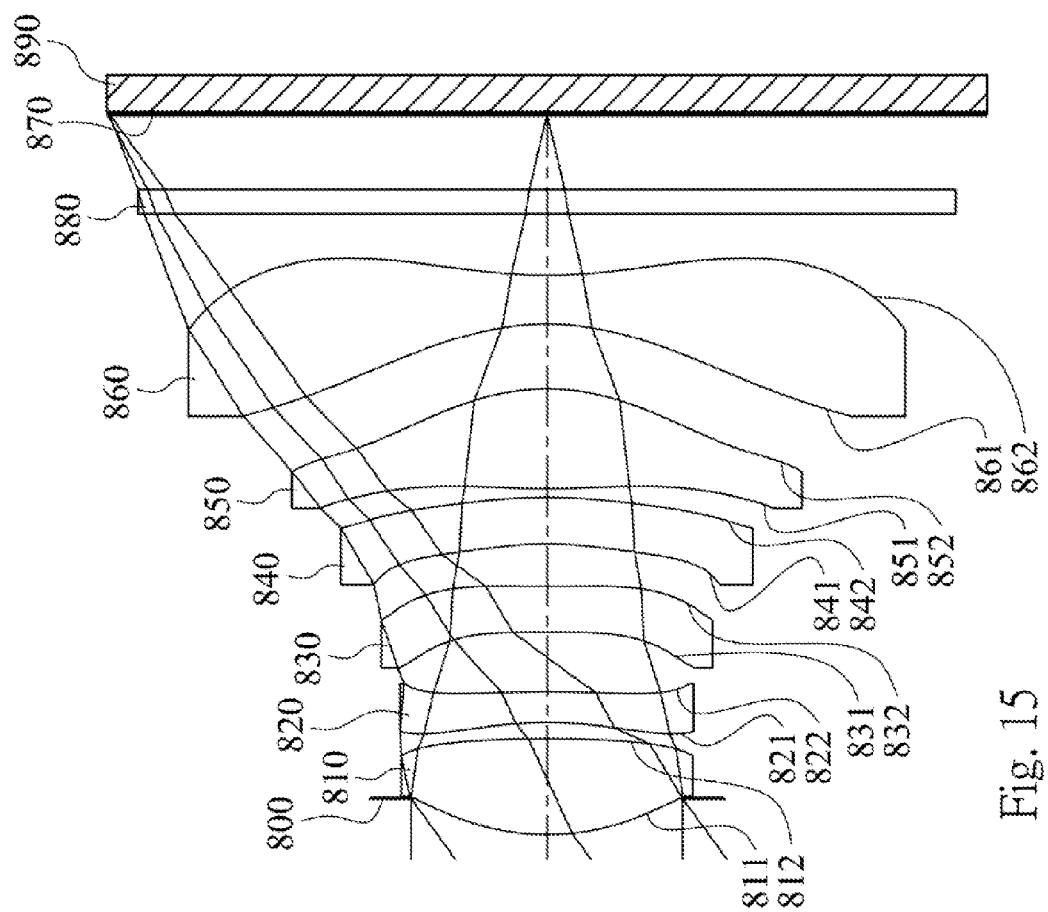
FIG. 15 is a schematic view of an image capturing device according to the 8th embodiment of the present disclosure.
Figure 16:
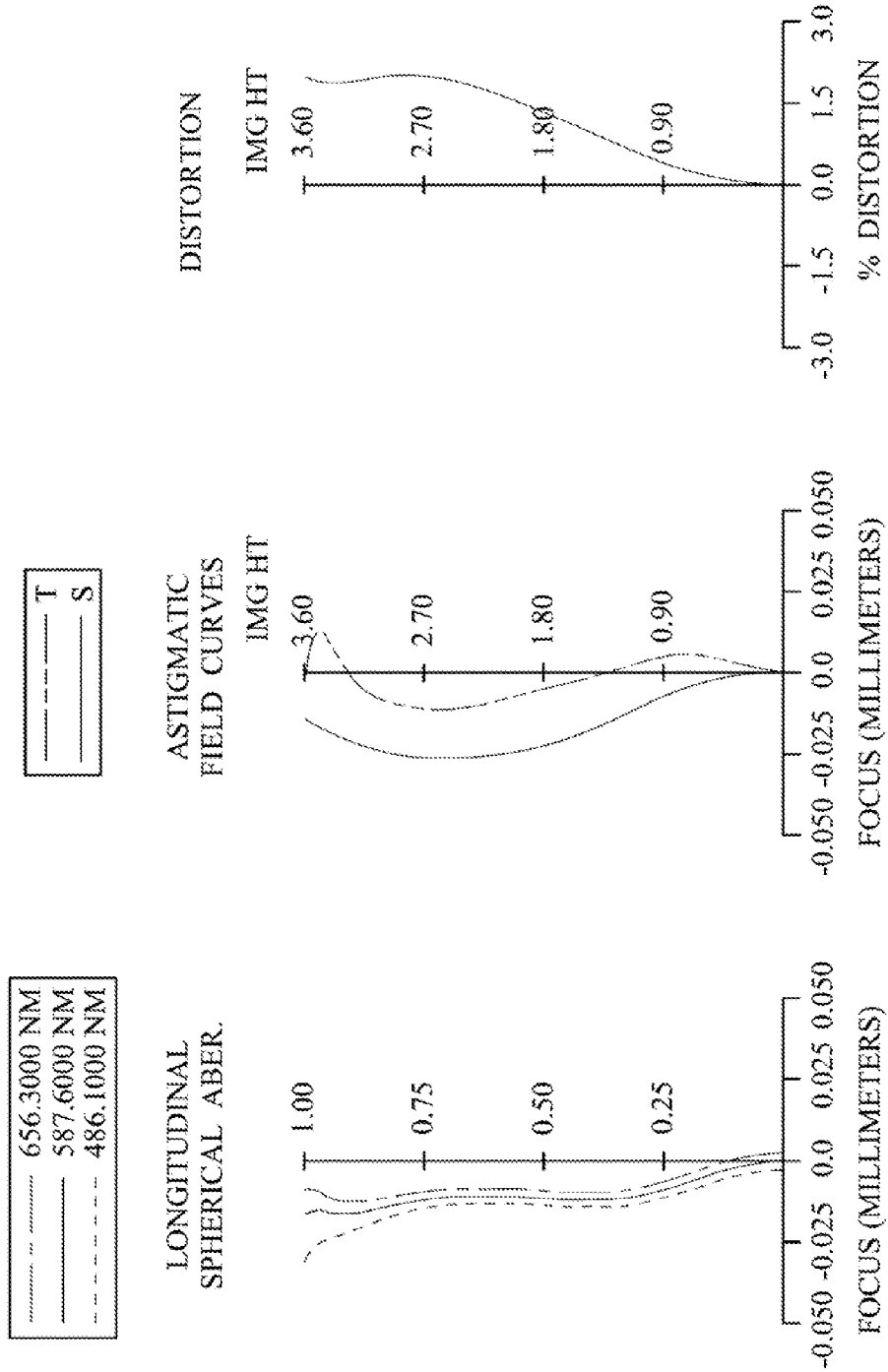
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. The image capturing device includes the optical imaging lens assembly (not otherwise herein labeled) of the present disclosure and an image sensor 890. FIG. 16 shows spherical aberration curves, astigmatic field curves and a distortion curve of the image capturing device according to the 8th embodiment. In FIG. 15, the optical imaging lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 880 and an image plane 870, wherein the optical imaging lens assembly has a total of six lens elements (810-860) with refractive power.

The first lens element 810 with positive refractive power has a convex object-side surface 811 and a convex image-side surface 812. The first lens element 810 is made of plastic material, and has the object-side surface 811 and the image-side surface 812 being both aspheric.

The second lens element 820 with negative refractive power has a concave object-side surface 821 and a convex image-side surface 822. The second lens element 820 is made of plastic material, and has the object-side surface 821 and the image-side surface 822 being both aspheric. Furthermore, both of the object-side surface 821 and the image-side surface 822 of the second lens element 820 have at least one inflection point.

The third lens element 830 with negative refractive power has a concave object-side surface 831 and a concave image-side surface 832. The third lens element 830 is made of plastic material, and has the object-side surface 831 and the image-side surface 832 being both aspheric. Furthermore, both of the object-side surface 831 and the image-side surface 832 of the third lens element 830 have at least one inflection point.

The fourth lens element 840 with negative refractive power has a concave object-side surface 841 and a convex image-side surface 842. The fourth lens element 840 is made of plastic material, and has the object-side surface 841 and the image-side surface 842 being both aspheric.

The fifth lens element 850 with positive refractive power has a convex object-side surface 851 and a convex image-side surface 852. The fifth lens element 850 is made of plastic material, and has the object-side surface 851 and the image-side surface 852 being both aspheric.

The sixth lens element 860 with negative refractive power has a concave object-side surface 861 and a concave image-side surface 862. The sixth lens element 860 is made of plastic material, and has the object-side surface 861 and the image-side surface 862 being both aspheric. Furthermore, both of the object-side surface 861 and the image-side surface 862 of the sixth lens element 860 have at least one inflection point. The slope of the tangent line changes from positive to negative between a paraxial region and an off-axis region of the image-side surface 862 of the sixth lens element 860. Please refer to FIG. 19 (exemplary figure), the exemplary figure for the present embodiment will not otherwise be provided herein.

The IR-cut filter 880 is made of glass material and located between the sixth lens element 860 and the image plane 870, and will not affect the focal length of the optical imaging lens assembly. The image sensor 890 is disposed on an image plane 870 of the optical imaging lens assembly.

The detailed optical data of the 8th embodiment are shown in Table 15 and the aspheric surface data are shown in Table 16 below.

TABLE 15

8th Embodiment
f = 4.89 mm, Fno = 2.20, HFOV = 35.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.295 | | | | |
| 2 | Lens 1 | 1.988 | ASP | 0.784 | Plastic | 1.535 | 55.7 | 3.25 |
| 3 | | −12.031 | ASP | 0.130 | | | | |
| 4 | Lens 2 | −3.377 | ASP | 0.250 | Plastic | 1.640 | 23.3 | −7.95 |
| 5 | | −10.348 | ASP | 0.492 | | | | |
| 6 | Lens 3 | −65.745 | ASP | 0.370 | Plastic | 1.583 | 30.2 | −22.22 |
| 7 | | 16.177 | ASP | 0.354 | | | | |
| 8 | Lens 4 | −2.672 | ASP | 0.380 | Plastic | 1.640 | 23.3 | −13.20 |
| 9 | | −4.126 | ASP | 0.067 | | | | |
| 10 | Lens 5 | 6.488 | ASP | 0.823 | Plastic | 1.544 | 55.9 | 2.68 |
| 11 | | −1.796 | ASP | 0.530 | | | | |
| 12 | Lens 6 | −2.069 | ASP | 0.400 | Plastic | 1.514 | 56.8 | −2.62 |
| 13 | | 4.092 | ASP | 0.500 | | | | |
| 14 | IR-cut filter | Plano | | 0.200 | Glass | 1.517 | 64.2 | — |
| 15 | | Plano | | 0.623 | | | | |
| 16 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | 8.3631E−02 | 5.3736E−01 | −2.4184E+01 | −7.6265E+00 | −1.0000E+00 | −1.0000E+00 |
| A4 = | −3.7876E−03 | −2.4175E−02 | −4.1191E−02 | 1.7301E−02 | −1.7500E−01 | −9.6377E−02 |
| A6 = | −9.0175E−03 | 1.6716E−02 | 1.2219E−01 | 6.2193E−02 | −5.8206E−04 | −2.2663E−02 |
| A8 = | 1.0900E−02 | −5.2658E−03 | −9.7126E−02 | −5.4708E−02 | 2.5800E−02 | 2.5509E−02 |
| A10 = | −2.2011E−02 | −4.0234E−02 | 1.8937E−02 | 2.9173E−02 | 1.4857E−03 | −6.2624E−03 |
| A12 = | 1.4399E−02 | 3.7227E−02 | 2.6001E−02 | −4.6464E−03 | −2.5756E−02 | −6.5773E−03 |
| A14 = | −6.1283E−03 | −1.1097E−02 | −1.0776E−02 | 2.7871E−03 | 1.5373E−02 | 3.2612E−03 |

| Surface # | 8 | 9 | 10 | 11 | 12 | 13 |
|---|---|---|---|---|---|---|
| k = | 6.7587E−01 | 2.7862E+00 | −1.0000E+00 | −2.4662E+00 | −5.8119E+00 | −6.4677E+00 |
| A4 = | 1.9079E−01 | 7.5666E−02 | −9.7422E−02 | −5.4242E−03 | −1.9569E−02 | −2.8542E−02 |
| A6 = | −1.8315E−01 | −6.5327E−02 | 4.7173E−02 | −6.2410E−04 | 7.7645E−03 | 4.8703E−03 |
| A8 = | 1.3622E−01 | 4.5902E−02 | −1.6939E−02 | 9.6923E−03 | −9.1587E−04 | −7.6847E−04 |
| A10 = | −7.6250E−02 | −2.0679E−02 | 3.2824E−03 | −4.3094E−03 | 9.3096E−06 | 7.5877E−05 |
| A12 = | 2.4040E−02 | 4.6229E−03 | −1.2549E−04 | 7.5895E−04 | 4.7532E−06 | −5.0297E−06 |
| A14 = | −3.7410E−03 | −3.5355E−04 | −3.3269E−05 | −5.2349E−05 | −2.0637E−07 | 1.5033E−07 |

In the optical imaging lens assembly according to the 8th embodiment, the definitions of the following parameters are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 4.89 | (R11 + R12)/(R11 − R12) | −0.33 |
| Fno | 2.20 | R10/R11 | 0.87 |
| HFOV [deg.] | 35.9 | f6/f2 | 0.33 |
| (V2 + V4)/V5 | 0.83 | DI/(Td + BL) | 1.22 |
| (CT2 + CT3 + CT4)/CT5 | 1.22 | Sd/Td | 0.94 |
| T34/T45 | 5.28 | Td/R4 | −0.44 |

9th Embodiment

Figure 17:
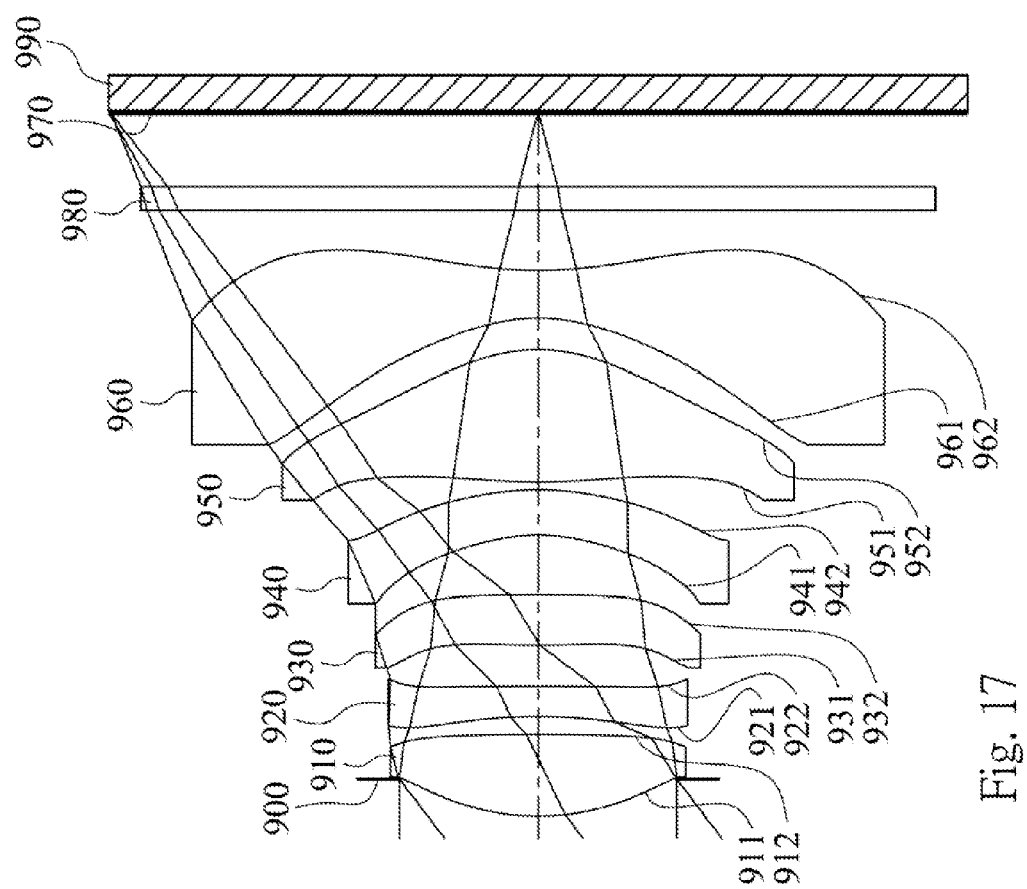
FIG. 17 is a schematic view of an image capturing device according to the 9th embodiment of the present disclosure.
Figure 18:
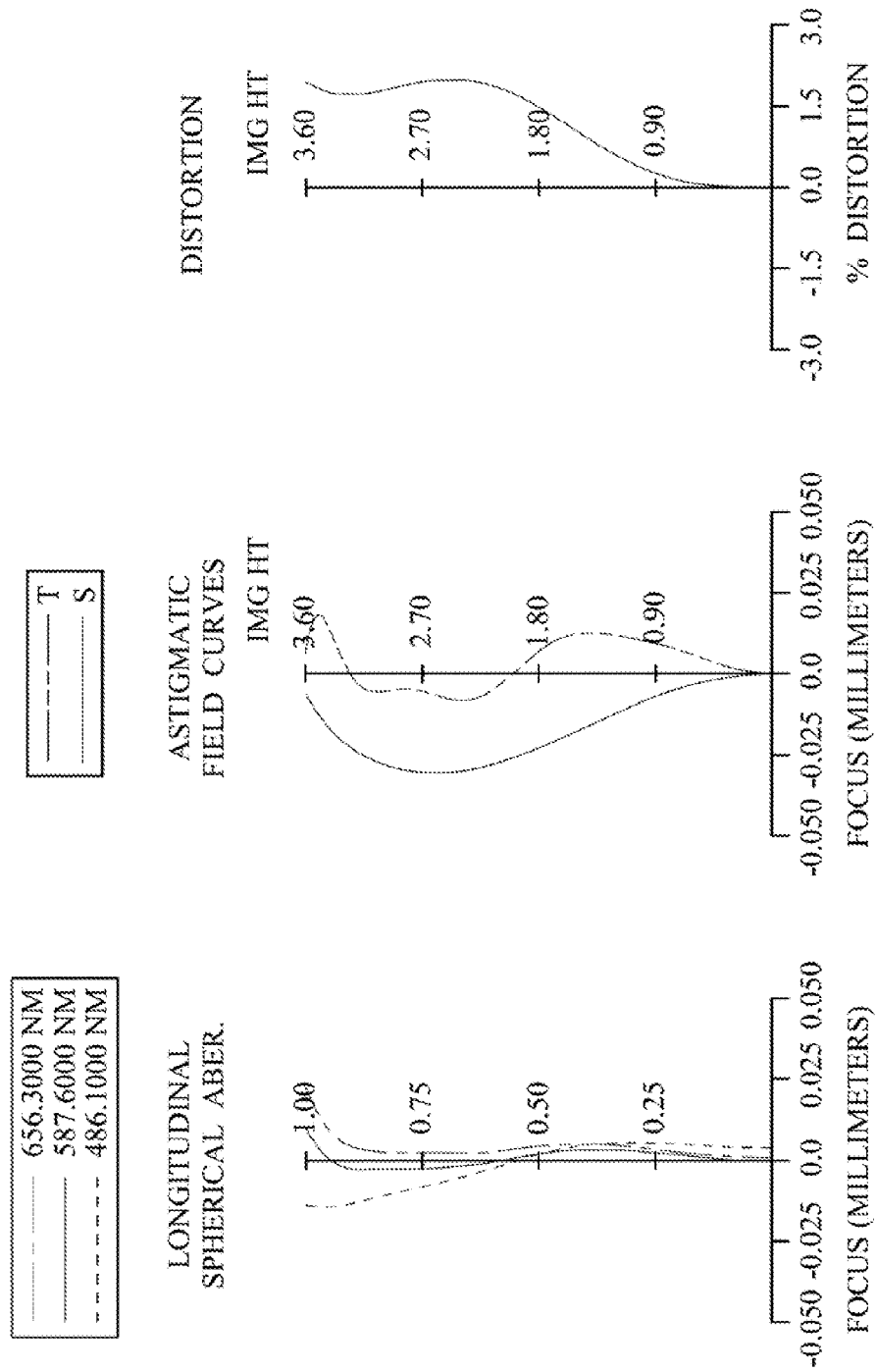
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. The image capturing device includes the optical imaging lens assembly (not otherwise herein labeled) of the present disclosure and an image sensor 990. FIG. 18 shows spherical aberration curves, astigmatic field curves and a distortion curve of the image capturing device according to the 9th embodiment. In FIG. 17, the optical imaging lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 980 and an image plane 970, wherein the optical imaging lens assembly has a total of six lens elements (910-960) with refractive power.

The first lens element 910 with positive refractive power has a convex object-side surface 911 and a convex image-side surface 912. The first lens element 910 is made of plastic material, and has the object-side surface 911 and the image-side surface 912 being both aspheric.

The second lens element 920 with negative refractive power has a concave object-side surface 921 and a convex image-side surface 922. The second lens element 920 is made of plastic material, and the object-side surface 921 and the image-side surface 922 being both aspheric. Furthermore, both of the object-side surface 921 and the image-side surface 922 of the second lens element 920 have at least one inflection point.

The third lens element 930 with positive refractive power has a convex object-side surface 931 and a convex image-side surface 932. The third lens element 930 is made of plastic material, and has the object-side surface 931 and the image-side surface 932 being both aspheric. Furthermore, the object-side surface 931 of the third lens element 930 has at least one inflection point.

The fourth lens element 940 with negative refractive power has a concave object-side surface 941 and a convex image-side surface 942. The fourth lens element 940 is made of plastic material, and has the object-side surface 941 and the image-side surface 942 being both aspheric.

The fifth lens element 950 with positive refractive power has a convex object-side surface 951 and a convex image-side surface 952. The fifth lens element 950 is made of plastic material, and has the object-side surface 951 and the image-side surface 952 being both aspheric.

The sixth lens element 960 with negative refractive power has a concave object-side surface 961 and a concave image-side surface 962. The sixth lens element 960 is made of plastic material, and has the object-side surface 961 and the image-side surface 962 being both aspheric. Furthermore, both of the object-side surface 961 and the image-side surface 962 of the sixth lens element 960 have at least one inflection point. The slope of the tangent line changes from positive to negative between a paraxial region and an off-axis region of the image-side surface 962 of the sixth lens element 960. Please refer to FIG. 19 (exemplary figure), the exemplary figure for the present embodiment will not otherwise be provided herein.

The IR-cut filter 980 is made of glass material and located between the sixth lens element 960 and the image plane 970, and will not affect the focal length of the optical imaging lens assembly. The image sensor 990 is disposed on an image plane 970 of the optical imaging lens assembly.

The detailed optical data of the 9th embodiment are shown in Table 17 and the aspheric surface data are shown in Table 18 below.

TABLE 17

9th Embodiment
f = 4.65 mm, Fno = 2.00, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.310 | | | | |
| 2 | Lens 1 | 2.065 | ASP | 0.665 | Plastic | 1.544 | 55.9 | 3.59 |
| 3 | | −32.051 | ASP | 0.150 | | | | |
| 4 | Lens 2 | −4.508 | ASP | 0.250 | Plastic | 1.640 | 23.3 | −7.36 |
| 5 | | −109.270 | ASP | 0.349 | | | | |
| 6 | Lens 3 | 7.805 | ASP | 0.418 | Plastic | 1.543 | 56.5 | 12.42 |
| 7 | | −48.866 | ASP | 0.507 | | | | |
| 8 | Lens 4 | −1.509 | ASP | 0.380 | Plastic | 1.640 | 23.3 | −7.39 |
| 9 | | −2.434 | ASP | 0.059 | | | | |
| 10 | Lens 5 | 4.478 | ASP | 1.113 | Plastic | 1.544 | 55.9 | 2.07 |
| 11 | | −1.369 | ASP | 0.270 | | | | |
| 12 | Lens 6 | −1.417 | ASP | 0.400 | Plastic | 1.514 | 56.8 | −1.91 |
| 13 | | 3.499 | ASP | 0.500 | | | | |
| 14 | IR-cut filter | Plano | | 0.200 | Glass | 1.517 | 64.2 | — |
| 15 | | Plano | | 0.623 | | | | |
| 16 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | 1.3154E−01 | 2.0000E+01 | −2.8596E+01 | 2.0000E+01 | −1.0000E+00 | −1.0000E+00 |
| A4 = | −2.9527E−03 | −1.9518E−02 | −5.6691E−02 | −4.7109E−02 | −1.1538E−01 | −3.8424E−02 |
| A6 = | −6.8953E−03 | 5.2960E−03 | 1.1117E−01 | 9.1772E−02 | −7.9776E−03 | −4.4745E−02 |
| A8 = | 1.0964E−02 | 1.6319E−02 | −8.2012E−02 | −6.9852E−02 | −8.6894E−03 | 1.6182E−02 |
| A10 = | −2.0779E−02 | −4.8145E−02 | 1.6065E−02 | 2.6049E−02 | 1.4108E−02 | −2.4147E−03 |
| A12 = | 1.4153E−02 | 3.1871E−02 | 1.6846E−02 | 2.4942E−03 | −1.6456E−02 | −4.4008E−03 |
| A14 = | −5.7495E−03 | −7.791E−03 | −6.2830E−03 | −1.0639E−03 | 8.1797E−03 | 1.9571E−03 |

| Surface # | 8 | 9 | 10 | 11 | 12 | 13 |
|---|---|---|---|---|---|---|
| k = | −2.9663E−01 | 2.6042E−01 | −1.0000E+00 | −3.6210E+00 | −5.1126E+00 | −8.5458E+00 |
| A4 = | 2.0155E−01 | 6.8721E−02 | −1.0577E−01 | −1.5220E−02 | −1.8293E−02 | −2.1221E−02 |
| A6 = | −1.9858E−01 | −6.5692E−02 | 5.4549E−02 | −1.9834E−02 | 1.2151E−03 | 2.2424E−03 |
| A8 = | 1.4719E01 | 4.5313E−02 | −1.8055E−02 | 9.3138E−03 | −4.0279E−04 | −4.1415E−04 |
| A10 = | −7.6255E−02 | −2.0295E−02 | 2.8732E−03 | −4.3123E−03 | 1.0076E−04 | 5.8583E−05 |
| A12 = | 2.0084E−02 | 4.9212E−03 | −1.7723E−04 | 7.6232E−04 | 8.2987E−06 | −6.0790E−06 |
| A14 = | −1.9179E−03 | −3.4230E−04 | −6.4201E−06 | −5.1049E−05 | −1.6825E−06 | 2.7428E−07 |

In the optical imaging lens assembly according to the 9th embodiment, the definitions of the following parameters are the same as those stated in the 1st embodiment with corresponding values for the 9th embodiment. Moreover, these parameters can be calculated from Table 17 and Table 18 as the following values and satisfy the following conditions:

| | 9th Embodiment | | |
|---|---|---|---|
| f [mm] | 4.65 | (R11 + R12)/(R11 − R12) | −0.42 |
| Fno | 2.00 | R10/R11 | 0.97 |
| HFOV [deg.] | 37.2 | f6/f2 | 0.26 |
| (V2 + V4)/V5 | 0.83 | DI/(Td + BL) | 1.22 |
| (CT2 + CT3 + CT4)/CT5 | 0.94 | Sd/Td | 0.93 |
| T34/T45 | 8.59 | Td/R4 | −0.04 |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
    a first lens element with positive refractive power having a convex object-side surface;
    a second lens element with negative refractive power having a concave object-side surface and a convex image-side surface;
    a third lens element having refractive power;
    a fourth lens element having refractive power,
    a fifth lens element having refractive power, wherein both of an object-side surface and an image-side surface of the fifth lens element are aspheric; and
    a sixth lens element with negative refractive power having a concave object-side surface and a concave image-side surface, wherein both of the object-side surface and the image-side surface of the sixth lens element are aspheric, and at least one of the object-side surface and the image-side surface of the sixth lens element has at least one inflection point;
    wherein the optical imaging lens assembly has a total of six lens elements with refractive power, a curvature radius of the object-side surface of the sixth lens element is R11, a curvature radius of the image-side surface of the sixth lens element is R12, an axial distance between the object-side surface of the first lens element and the image-side surface of the sixth lens element is Td, a curvature radius of the image-side surface of the second lens element is R4, and the following conditions are satisfied:

$-1.0<(R11+R12)/(R11-R12)<0.35$; and $-3.0<Td/R4<0$.

2. The optical imaging lens assembly of claim 1, wherein the fifth lens element has positive refractive power.

3. The optical imaging lens assembly of claim 2, wherein the fifth lens element has a convex image-side surface.

4. The optical imaging lens assembly of claim 2, wherein at least one of the object-side surface and the image-side surface of the second lens element has at least one inflection point.

5. The optical imaging lens assembly of claim 2, wherein a curvature radius of an object-side surface of the third lens element is R5, a curvature radius of an image-side surface of the third lens element is R6, and the following conditions are satisfied:

$R5>0$; and $R6>0$.

6. The optical imaging lens assembly of claim 2, wherein the fourth lens element has a concave object-side surface and a convex image-side surface.

7. The optical imaging lens assembly of claim 2, wherein an Abbe number of the second lens element is V2, an Abbe number of the fourth lens element is V4, an Abbe number of the fifth lens element is V5, and the following condition is satisfied:

$0.2<(V2+V4)/V5<1$.

8. The optical imaging lens assembly of claim 1, wherein the axial distance between the object-side surface of the first lens element and the image-side surface of the sixth lens element is Td, the curvature radius of the image-side surface of the second lens element is R4, and the following condition is satisfied:

−1.3<Td/R4<0.

9. The optical imaging lens assembly of claim 8, wherein a focal length of the second lens element is f2, a focal length of the sixth lens element is f6, and the following condition is satisfied:

0.10<f6/f2<0.40.

10. The optical imaging lens assembly of claim 8, further comprising:
a stop disposed between an imaged object and the first lens element, wherein an axial distance between the stop and the image-side surface of the sixth lens element is Sd, the axial distance between the object-side surface of the first lens element and the image-side surface of the sixth lens element is Td, and the following condition is satisfied:

0.9<Sd/Td<1.0.

11. The optical imaging lens assembly of claim 8, wherein at least one of the object-side surface and the image-side surface of the third lens element has at least one inflection point.

12. The optical imaging lens assembly of claim 1, wherein twice a maximum image height of the optical imaging lens assembly is DI, the axial distance between the object-side surface of the first lens element and the image-side surface of the sixth lens element is Td, an axial distance between the image-side surface of the sixth lens element and the image plane is BL, and the following condition is satisfied:

1.1<DI/(Td+BL)<2.5.

13. The optical imaging lens assembly of claim 1, wherein a slope of a tangent line changes form positive to negative between a paraxial region and an off-axis region of the image-side surface of the sixth lens element.

14. An optical imaging lens assembly comprising, in order from an object side to an image side:
a first lens element with positive refractive power having a convex object-side surface;
a second lens element with negative refractive power having a concave object-side surface and a convex image-side surface;
a third lens element having positive refractive power;
a fourth lens element having refractive power;
a fifth lens element having positive refractive power, wherein both of an object-side surface and an image-side surface of the fifth lens element are aspheric; and
a sixth lens element with negative refractive power having a concave object-side surface and a concave image-side surface, wherein both of the object-side surface and the image-side surface of the sixth lens element are aspheric, and at least one of the object-side surface and the image-side surface of the sixth lens element has at least one inflection point;
wherein the optical imaging lens assembly has a total of six lens elements with refractive power, a curvature radius of the object-side surface of the sixth lens element is R11, a curvature radius of the image-side surface of the sixth lens element is R12, an axial distance between the object-side surface of the first lens element and the image-side surface of the sixth lens element is Td, a curvature radius of the image-side surface of the second lens element is R4, and the following conditions are satisfied:

−1.0<(R11+R12)/(R11−R12)<0.65; and

−3.0<Td/R4<0.

15. The optical imaging lens assembly of claim 14, wherein a focal length of the second lens element is f2, a focal length of the sixth lens element is f6, and the following condition is satisfied:

0.10<f6/f2<0.40.

16. The optical imaging lens assembly of claim 14, wherein the curvature radius of the object-side surface of the sixth lens element is R11, the curvature radius of the image-side surface of the sixth lens element is R12, and the following condition is satisfied:

−1.0<(R11+R12)/(R11−R12)<0.35.

17. The optical imaging lens assembly of claim 14, wherein the curvature radius of the object-side surface of the sixth lens element is R11, the curvature radius of the image-side surface of the sixth lens element is R12, and the following condition is satisfied:

−0.55<(R11+R12)/(R11−R12)<0.15.

18. The optical imaging lens assembly of claim 14, wherein the fourth lens element has a concave object-side surface and a convex image-side surface.

19. The optical imaging lens assembly of claim 14, wherein an axial distance between the third lens element and the fourth lens element is T34, an axial distance between the fourth lens element and the fifth lens element is T45, and the following condition is satisfied:

1.5<T34/T45<10.

20. The optical imaging lens assembly of claim 14, wherein a curvature radius of the image-side surface of the fifth lens element is R10, the curvature radius of the object-side surface of the sixth lens element is R11, and the following condition is satisfied:

0.2<R10/R11<0.9.

21. The optical imaging lens assembly of claim 14, wherein a central thickness of the second lens element is CT2, a central thickness of the third lens element is CT3, a central thickness of the fourth lens element is CT4, a central thickness of the fifth lens element is CT5, and the following condition is satisfied:

0.5<(CT2+CT3+CT4)/CT5<1.3.

22. An image capturing device, comprising:
the optical imaging lens assembly of claim 14; and
an image sensor, wherein the image sensor is disposed on an image plane of the optical imaging lens assembly.

* * * * *